US008042098B2

(12) United States Patent
Do et al.

(10) Patent No.: US 8,042,098 B2
(45) Date of Patent: Oct. 18, 2011

(54) METHOD AND APPARATUS FOR PRODUCING SOFTWARE

(75) Inventors: Sung-Hee Do, Lexington, MA (US); Nam Pyo Suh, Sudbury, MA (US)

(73) Assignee: Axiomatic Design Software, Inc., Boston, MA (US)

( * ) Notice: Subject to any disclaimer, the term of this patent is extended or adjusted under 35 U.S.C. 154(b) by 2059 days.

(21) Appl. No.: 10/100,236

(22) Filed: Mar. 18, 2002

(65) Prior Publication Data

US 2002/0170042 A1 Nov. 14, 2002

Related U.S. Application Data

(63) Continuation-in-part of application No. 09/731,678, filed on Dec. 6, 2000, now Pat. No. 7,546,577.

(60) Provisional application No. 60/323,848, filed on Sep. 21, 2001.

(51) Int. Cl.
*G06F 9/44* (2006.01)
(52) U.S. Cl. .................. 717/123; 717/101; 717/108
(58) Field of Classification Search .................. 717/104, 717/123, 124, 131
See application file for complete search history.

(56) References Cited

U.S. PATENT DOCUMENTS

| 5,519,868 | A | * | 5/1996 | Allen et al. | 717/169 |
| 5,642,472 | A | * | 6/1997 | Cohen | 706/12 |
| 5,862,382 | A | * | 1/1999 | Kataoka | 717/131 |
| 6,240,549 | B1 | * | 5/2001 | Hamada et al. | 717/130 |

OTHER PUBLICATIONS

Biggerstaff, "Design Recovery for Maintenance and Reuse", 1989, IEEE, pp. 36-49. This document is cited to teach reverse engineering design from source code.*
Damiani et al. "A Descriptor-Based Approach to OO Code Reuse", 1997, IEEE, pp. 73-80.*
Demeyer et al. "Using Restructuring Transformations to Reengineer Object-Oriented Systems", 1997, Tech Report, Software Composition Group, University of Berne.*
Tichelaar et al. "An Exchange Model for Reengineering Tools", 1998, Lecture Notes in Computer Science, vol. 1543.*
Richner et al. "Recovering High-Level Views of Object-Oriented Applications from Static and Dynamic Information", 1999, Software Maintenance, 1999.*
Lucca et al. "Recovering Use Case Models from Object-Oriented Code: a Thread-based Approach", 2000, IEEE, pp. 108-117.*
David Budgen, "Design Models from Software Design Methods", Jul. 1995, Design Studies, vol. 16, Issue 3, pp. 293-325.*

(Continued)

*Primary Examiner* — Lewis Bullock, Jr.
*Assistant Examiner* — Jue Wang
(74) *Attorney, Agent, or Firm* — Wolf, Greenfield & Sacks, P.C.

(57) ABSTRACT

A method is provided for determining a sequence of implementation of elements of a software design. The sequence of implementation may be determined by examining coupling between the elements. Further, a method for determining a sequence of testing of elements of the software design is provided which may also be determined by examining coupling between the elements. Further, a method is provided for reverse engineering a design of previously-implemented software, and to identify coupling in the software. Because a developer can determine the degree of coupling of the software, the software may be more easily modified, maintained, evaluated, and combined into larger software systems. Also, because coupling may be identified, elements of the design may be more easily grouped into object-oriented classes. Further, existing object-oriented designs may be evaluated based on the degree of coupling.

32 Claims, 25 Drawing Sheets

OTHER PUBLICATIONS

Pauw et al., "Modeling Object-Oriented Program Execution", 1994, Lecture Notes in Computer Science, vol. 821, pp. 163-182.*

Tegarden et al. "A Software Complexity Model of Object-Oriented Systems", 1995, Design Support Systems, pp. 241-262.*

Sullivan et al. "The Structure and Value of Modularity in Software Design", Mar. 2001, University of Virginia Computer Science Technical Report cs-2001-13.*

Albano, Leonard D. and Suh, Nam P., "Axiomatic Approach to Structural Design," *Research in Engineering Design.*, 1992, vol. 4, pp. 171-183.

Schach, Stephen R., "Software Life-Cycle Models," *Classical and Object-Oriented Software Engineering*, Chapter 3, pp. 66-65, Fourth edition (1999), WCB McGraw-Hill.

Jacobsen, Ivar et al., "The Unified Process: Use-Case Driven, Architecture-Centric, Iterative, and Incremental," Chapter 1, pp. 3-13 and "An Iterative and Incremental Process," Chapter 5, pp. 85-107, *The Unified Software Development Process*, Fourth printing (1999), Addison-Wesley.

Suh, Nam P., "Design Axioms and Quality Control," *Robotics and Computer-Integrated Manufacturing*, 1992, vol. 9, No. 4/5, pp. 367-376.

Suh, Nam P., "Quality and Reliability of Products Through Proper Design," presented at the *Proceedings of the Quality Through Design Conference*, Bangalore, India, Jun. 1993.

Albano, Leonard D. et al., "A Framework for Performance-Based Design," *Research in Engineering Design.*, 1993, vol. 5, pp. 105-119.

Wallace, David R. and Suh, Nam P., "Information-based Design for Environmental Problem Solving," *Annals of the CIRP*, pp. 175-180, 1993, vol. 42, No. 1.

Suh, Nam P., "Manufacturing and Productivity," *Innovations and Materials Processing*, Plenum Publishing Corporation, 1985, pp. 9-81.

Kim, Steven H. and Suh, Nam P., "Application of Symbolic Logic to the Design Axioms," *Robotics and Computer-Integrated Manufacturing*, 1985, vol. 2, No. 1, pp. 55-64.

Kim, Steven H. and Suh, Nam P., "Formulation of the Design Axioms Through Symbolic Logic," presented at the *Second International Conference on the Science, Technology and Systems of the Future*, Sep. 1985.

Kim, Steven H. and Suh, Nam P., "On a Consultive Expert System for Design Axiomatics," presented at *Intelligent Manufacturing Systems: An International Conference*, Budapest, Hungary, Jun. 1986, pp. 2-6.

Kim, Steven H. and Suh, Nam P., "Mathematical Foundations for Manufacturing," *Journal of Engineering for Industry*, Aug. 1987, vol. 109, pp. 213-218.

Suh, Nam P., "A Perspective on Manufacturing," *Robotics and Computer-Integrated Manufacturing.*, 1988, vol. 4, No. 3/4, pp. 297-307.

Kim, Steven H. and Suh, Nam P., "On a Expert System for Design and Manufacturing," *Proc. COMPINT'85*, ACM and IEEE/Computer Society, Montreal, Canada, Sep. 1985: 89-95, pp. 1-7.

Kim, Sang-Gook and Suh, Nam P., "Knowledge-Based Synthesis System for Injection Molding," *Robotics and Computer-Integrated Manufacturing.*, 1987, vol. 3, No. 2, pp. 181-186.

Suh, Nam P., University-Industry Interaction for the Innovation of New Products and Processes: A U.S. Model, *Robotics and Computer-Integrated Manufacturing.*, 1990, vol. 7, No. 1/2, pp. 15-25.

Suh, Nam P. and Sekimoto, Shinya, "Design of Thinking Design Machine," *Annals of the CIRP*, 1990, vol. 39, No. 1, p. 145-148.

Kim, Sun-Jae. et al., "Design of Software Systems Based on Axiomatic Designs," *Robotics and Computer-Integrated Manufacturing.*, 1991, vol. 8, No. 4, pp. 243-255.

Gebala, David A. and Suh, Nam P., "An Application of Axiomatic Designs," *Research in Engineering Design*, 1992, vol. 3, pp. 149-162.

Sullivan, Kevin J. et al, "The Structure and Value of Modularity in Software Design," presented at the *Proceedings of the Joint International Conference on Software Engineering and ACM SIGSOFT Symposium on the Foundations of Software Engineering*, Vienna, Austria, Sep. 2001, pp. 1-10.

Suh, Nam P., "Introduction," Chapter 1, pp. 3-24 and "Design and Design Processes" Chapter 2, pp. 25-45, *The Principles of Design*, 1990, First edition, Oxford University Press, New York.

Suh, Nam P., "Editorial" p. 1 and "The Future of the Factory," pp. 39-49, *Robotics and Computer-Integrated Manufacturing*, 1984, vol. 1, No. 1.

El-Haik, Basem, "The Integration of Axiomatic Design in the Engineering Design Process," presented at the $11^{th}$ *Annual RMSL Workshop*, May 10-12, 1999 Auburn Hills, Michigan, pp. 1-8.

Suh, Nam P. et al, "On a Axiomatic Approach to Manufacturing and Manufacturing Systems," *Journal of Engineering for Industry*, May 1978, vol. 100, pp. 127-130.

Suh, Nam P. et al, "Design and Operation of Large Systems," *Journal of Manufacturing Systems*, 1995, vol. 14, No. 3, pp. 203-213.

Suh, Nam P., "Designing-in of Quality Through Axiomatic Design," *IEEE Transactions on Reliability*, Jun. 1995, vol. 44, No. 2, pp. 256-264.

Suh, Nam P., "Development of the Science Base for the Manufacturing Field Through the Axiomatic Approach," *Robotics and Computer-Integrated Manufacturing*, 1984, vol. 1, No. 3/4, pp. 397-415.

Nakazawa, Hiromu and Suh, Nam P., "Process Planning Based on Information Concept," *Robotics and Computer-Integrated Manufacturing*, 1984, vol. 1, No. 1, pp. 115-123.

Nam P. Suh and James R. Rinderie, "Qualitative and Quantitative Use of Design and Manufacturing Axioms," *Annals of CIRP*, 1982, vol. 31, No. 1.

Suh, Nam P. et al., "Application of Axiomatic Design Techniques to Manufacturing," *The American Society of Mechanical Engineers for presentation at the Winter Annual Meeting*, Dec. 2-7, 1979, New York, NY.

Leonard D. Albano and Suh, Nam P., "Axiomatic Design and Concurrent Engineering," 1994, Butterworth-Heinemann Ltd.

Suh, Nam P., "Axiomatic Design of Mechanical Systems," *Transactions of the ASME*, Jun. 1995, vol. 117, pp. 2-10.

Suh, Nam P..., "Impact of Axiomatic Design," *Keynote Address at the 1996 CIRP Design Workshop*, Tokyo, Japan, 1996, pp. 1-12.

Nordlund, Mats et al., "Growth of Axiomatic Design Through Industrial Practice," $3^{rd}$ *CIRP Workshop on Design and the Implementation of Intelligent Manufacturinl Systems*, Jun. 19-21, 1996, Tokyo, Japan, pp. 77-84.

Suh, Nam P., "Manufacturing System Design," *48th General Assembly of CIRP*, 1998, pp. 627-639.

Rinderie, J.R. and Suh Nam P., "Measures of Functional Coupling in Design," *The American Society of Mechanical Engineers*, Nov. 22, 198, New York, NY, pp. 1-6.

Do, Sung-Hee and Suh, Nam P., "Systematic OO Programming with Axiomatic Design," IEEE Comput. Society, Oct. 1999, vol. 32, No. 10, p. 121-124.

Hartunian, Vigain et al., "Decision Making and Software Tools for Product Development Based on Axiomatic Design," submitted to the 1996 CIRP General Assembly, Aug. 25-31, 1996, pp. 1-7, Como, Italy.

Suh, Nam P., "Axiomatic Design Theory for Systems," Research in Engineering Design, 1998, vol. 10, No. 4, pp. 189-209.

Suh, Nam P., "A UML-Based Object-Oriented Framework Development Methodology," Software Engineering Conference, Dec. 2-4, 1998, pp. 211-218, Taipei, Taiwan.

Sullivan, Kevin et al. "The structure and value of modularity in software design." Proceedings of the Joint International Conference on Software Engineering and ACM SIGSOFT Symposium and the Foundation of Software Engineering, Sep. 2001, Vienna; 10 pages.

* cited by examiner

| UNCOUPLED - *DESIRED* | | | |
|---|---|---|---|
| | DP1 | DP2 | DP3 |
| FR1 | X | O | O |
| FR2 | O | X | O |
| FR3 | O | O | X |

| DECOUPLED - *ACCEPTABLE* | | | |
|---|---|---|---|
| | DP1 | DP2 | DP3 |
| FR1 | X | O | O |
| FR2 | X | X | O |
| FR3 | X | X | X |

| COUPLED - *UNDESIRED* | | | |
|---|---|---|---|
| | DP1 | DP2 | DP3 |
| FR1 | X | X | X |
| FR2 | X | X | X |
| FR3 | X | X | X |

STEP 1. SCAN EACH FILES TO CAPTURE ATTRIBUTES & METHOD INFORMATION

Scenario.java: firstFileScan()

```
ci.setPublic();
ci.setPackageName("ads.fr5_ad_modeler.fr53
_reverse_engineering");
ci.setName("code");
ci.setComment("");

// Attribute assign
Code node = new Code();
node.setProtected();
node.setType("int");
node.setName("status_");
node.setComment("");
ci.initAttribute(node);

...

// Method assign
MethodInfo nodeM = new MethodInfo();
nodeM.setPublic();
nodeM.setType("creator");
nodeM.setName("Code");
nodeM.setComment("");
ci.initMethod(nodeM);

...

nodeM = new MethodInfo();
nodeM.setPublic();
nodeM.setType("void");
nodeM.setName("setType");
nodeM.setComment("");
node = new Code();
node.setType("String");
node.setName("t");
node.setComment("");
nodeM.initInputArgument(node);
ci.methods_appendLink(nodeM)

...
```

Code.java

```
package ads.fr5_ad_modeler.fr53
reverse_engineering;

import ads.fr2_exception.*;
import ads.fr4_multi_user.*;

public class Code extends Sibling_
FR4_1 { protected int        status_;
protected String     type_;
protected String     name_;
protected String     comment_;  //

...

public Code() {
    super();

status_ = -1;
    type_ = "";
    name_ = "";
    comment_ = "";
}

...

public void setType(String t) {
    type_ =new String(t);
}

...
```

SCANNED FROM SOURCE CODE

FIG. 6A

STEP 2. SCAN EACH FILES TO CAPTURE RELATION BETWEEN
ATTRIBUTES & METHOD OR METHOD & METHOD

Scenario.java: firstFileScanRelation()

```
pushAttribute(ci, (MethodInfo)ci.methods
  _.findLink("creator", "Code"), "status_");
pushAttribute(ci, (MethodInfo)ci.methods
  _.findLink("creator", "Code"), "type_");
pushAttribute(ci, (MethodInfo)ci.methods
  _.findLink("creator", "Code"), "name_");
pushAttribute(ci, (MethodInfo)ci.methods
  _.findLink("creator", "Code"), "comment_");

...

pushAttribute(ci, (MethodInfo)ci.methods
  _.findLink("void", "setType"), "type_");

...

pushMethod(ci, (MethodInfo)ci.methods
  _.findLink("Sibling_FR4_1", "deleteLink"),
  "cleanData");
```

Code.java

```
package ads.fr5_ad_modeler.fr53_
reverse_engineering;

import ads.fr2_exception.*;
import ads.fr4_multi_user.*;

public class Code extends Sibling
_FR4_1 {
    protected int          status_;
    protected String       type_;
    protected String       name_;
    protected String       comment_;

public Code() {
        super();
        status_ = -1;
        type_ = "";
        name_ = "";
        comment_ = "";
    }
    ...
    public void setType(String t) {
        type_=new String(t);
    }
    ...
    protected void cleanData() throws
    AcclaroException_FR2 {
        this.type_ = null;
        this.name_ = null;
        this.comment_ = null;
    } public Sibling_FR4_1 deleteLink(boole
    an deleteAttachedLink)throws Accelaro
    Exception_FR2 {
        this.cleanData();
        return super.deleteLink(deleteAttac
        hedLink);
    }
}
```

FIG. 6B

STEP 3. SCAN EACH FILES TO CAPTURE DEPENDENCIES BETWEEN CLASS & CLASS

Scenario.java: firstFileScanDependency()    Code.java

```
Dependency dep=new Dependency();
dep.setClass((ClassInfo)ci findLink
("ads.fr4_multi_user", "Sibling_FR4_1"));
dep.setType("extends");
ci.initDependency(dep);

dep=new Dependency();
dep.setClass((ClassInfo)ci.findLink("ads.
fr4_multi_user", "Sibling_FR4_1"));
dep.setType("super");
MethodInfo mi=(MethodInfo)ci.methods_find
Link("creator", "Code");
mi.initDependency(dep);

dep=new Dependency();
dep.setClass((ClassInfo)ci.findLink("ads.
fr2_exception","AcclaroException_FR2
"));
dep.setType("throws");
mi=(MethodInfo)ci.methods_findLink("Object"
, "cleanData");
mi.initDependency(dep);
```

```
package ads.fr5_ad_modeler.fr53_
reverse_engineering;

import ads.fr2_exception.*;
import ads.fr4_multi_user.*;

public class Code extends Sibling_
FR4_1 {
    protected int       status_;
    protected String    type_;
    protected String    name_;
    protected String    comment_;

public Code() {
        super();
        status_ = -1;
        type_ = "";
        name_ ="";
        comment_ ="";
    }
    ...
    public void setType(String t) {
        type_=new String(t);
    }
    ...
    protected void cleanData() throws Accl
    aroException_FR2 {
        this.type_ = null;
        this.name_ = null;
        this.comment_ = null;
    } public Sibling_FR4_1 deleteLink(boolean
    deleteAttachedLink)throws AccelaroExce
    ption_FR2 {
        this.cleanData();
        return super.deleteLink(deleteAtta
        chedLink);
    }
```

FIG. 6C

|  | DP A | DP B | DP C | DP D | DP E |
|---|---|---|---|---|---|
| FR A | X |  |  |  |  |
| FR B | X | X |  |  |  |
| FR C |  | X | X |  |  |
| FR D | X | X |  | X |  |
| FR E |  |  | X | X | X |
DESIGN EQUATION 950
FIG. 9A
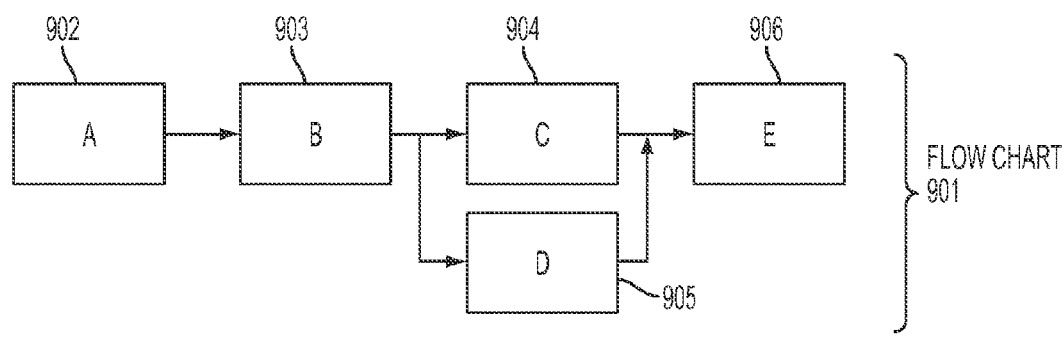
FIG. 9B
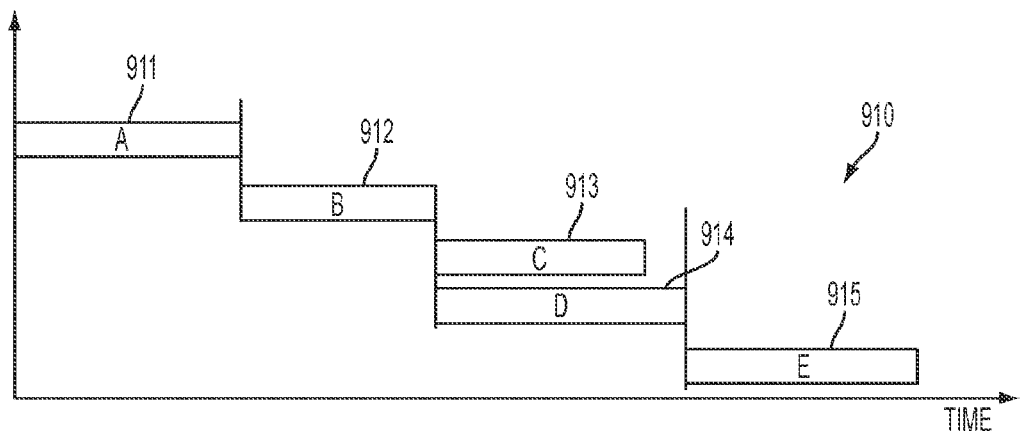
FIG. 9C

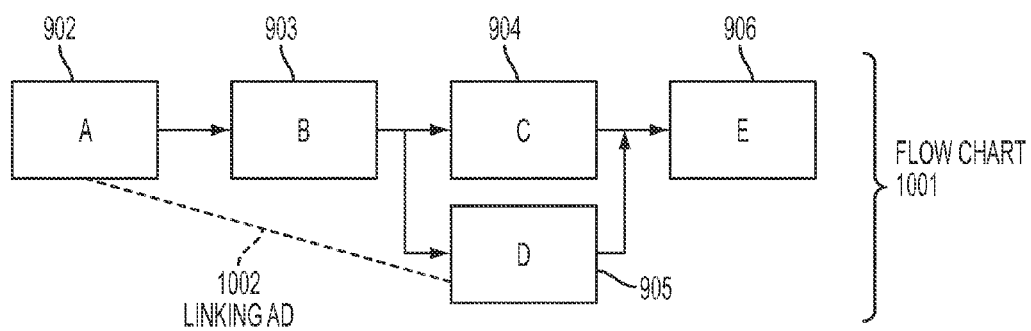
FIG. 10A
FIG. 10B
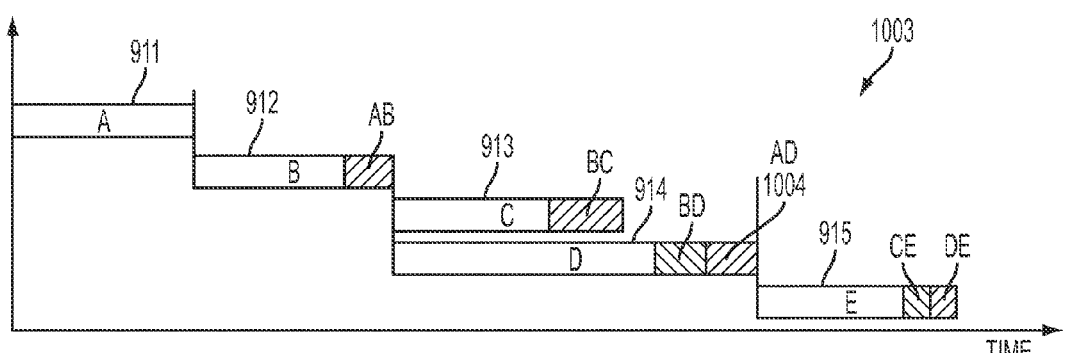
FIG. 10C

DESIGN EQUATION 1150

|     | DP1 | DP2 | DP3 | DP4 | DP5 | DP6 | DP7 | DP8 |
|-----|-----|-----|-----|-----|-----|-----|-----|-----|
| FR1 | X   | O   | O   | O   | O   | O   | O   | O   |
| FR2 | X   | X   | O   | O   | O   | O   | O   | O   |
| FR3 | X   | X   | X   | O   | O   | O   | O   | O   |
| FR4 | X   | X   | O   | X   | O   | O   | O   | O   |
| FR5 | X   | X   | O   | X   | X   | O   | O   | O   |
| FR6 | X   | X   | O   | X   | X   | X   | O   | O   |
| FR7 | X   | X   | X   | X   | X   | O   | X   | O   |
| FR8 | X   | X   | X   | X   | X   | X   | X   | X   |

FIG. 11

EXAMPLE OF FLOWCHART

DECISION A
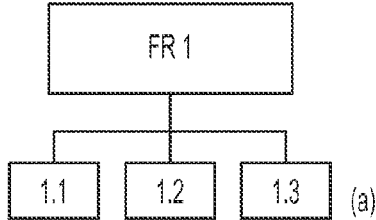 (a)
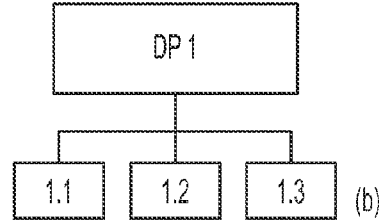 (b)
DECISION B
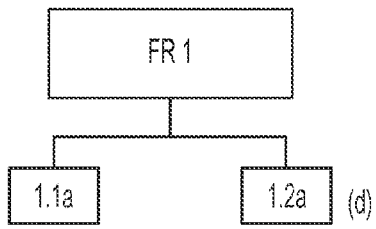 (d)
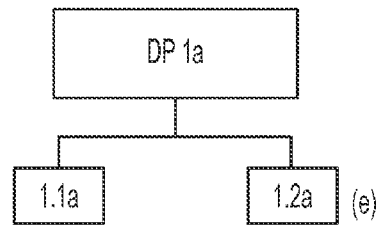 (e)
DECISION HISTORY DIAGRAM
FIG. 15

FIG. 17A

METHOD AND APPARATUS FOR PRODUCING SOFTWARE

RELATED APPLICATIONS

This application claims the benefit under Title 35 U.S.C. §119(e) of U.S. Provisional Application Serial No. 60/323,848, filed Sep. 21, 2001, entitled "METHOD AND APPARATUS FOR PRODUCING SOFTWARE" by Sung-Hee Do et. al., and U.S. Provisional Application filed Feb. 1, 2002, entitled "SYSTEM AND METHOD FOR DETERMINING AN IMPLEMENTATION AND TESTING SEQUENCE OF SOFTWARE" by Sung-Hee Do et. al., and is a continuation-in-part of application Ser. No. 09/731,678, filed Dec. 6, 2000, now U.S. Pat. No. 7,546,577 entitled "METHOD AND APPARATUS FOR PRODUCING SOFTWARE" by Sung-Hee Do, Nam Pyo Suh, Robert Joseph Powers, and Derrick Edward Tate and which is now pending, and the contents of the aforementioned applications are incorporated herein by reference.

FIELD OF THE INVENTION

The invention relates generally to software systems, and more specifically to a system and method for designing and producing software code.

BACKGROUND

There are many different methods for producing software. Programmers design and program software manually in some type of programming language such as C, C++, Java, C# (C-Sharp), and by using a software design tool such as those available from the Rational Software Corporation. There are problems with traditional methods of software design, in that the quality of code produced by traditional methods generates flawed software components because of human error. Further, when these components are modified, the software design needs to be retested, as there are typically relationships between components that have been modified and other components that access them. Also, individuals may develop certain code components that cannot be reused in later projects.

Object-oriented software is typically produced by programmers who have predetermined ideas regarding how a software system should be designed. These programmers determine, in an ad-hoc manner, the structure of classes (or class hierarchy), and this structure may not be optimal. Current software tools and design methods, such as those available from the Rational Software Corporation and modeling standards such as the Unified Modeling Language (UML), allow programmers to diagram object hierarchies and show interactions between objects. These tools and methods are more fully described in the book entitled "The Unified Software Development Process" by I. Jacobson, et al., Addison-Wesley, Upper Saddle River, N.J. (1999), incorporated by reference herein in its entirety. However, these tools are merely diagramming tools, requiring analysts to manually determine object structure features. That is, these tools only produce software architecture designs as good as the information input to the tools by programmers.

Additionally, as demand for software applications suited for a very particular task increases, the need to develop software rapidly and inexpensively becomes very important. Conventional programming methods are ad hoc methods that require the developer to modify previously written code based on changes or errors in subsequent code. Modifying previously written code adds to the time of a project and consequently increases costs.

Also, the design and production of quality software is a typically a long-term process involving design, coding and testing periods. Because software production cycles must decrease to meet shorter design schedules, it would be beneficial to have a software system and method that produces code in an error-free, efficient, and expedient manner. Also, it would be beneficial to be able to reuse software code between projects. In summary, existing methods for producing software are non-optimal, resulting in increased cost of development, high maintenance costs, limited reusability, extensive debugging and testing, and poor documentation.

SUMMARY OF THE INVENTION

Conventional methods of designing and implementing software applications often lead to lengthy development cycles and consequently high cost, due to the iterative nature of such methods. For example, a developer may make a modification to one component of the application which requires him to make many other modifications in many other completed components of the application.

Further, software design is not optimized because software design processes are performed by humans using non-optimizing processes. For example, individuals may develop individual components of code that perform redundant functions, exchange unnecessary information, or depend on other components in an inefficient manner. For example, repetition of function from one object to another, high degree of interaction between objects, unnecessary message passing, and other design mistakes resulting from human error each contribute to flawed software design.

According to one aspect of the invention, a method is provided for developing software, comprising acts of determining a coupling between a plurality of elements of a software design and determining a sequence of implementation of the plurality of elements based on the coupling. In one embodiment of the invention, coupling is determined by examining off-diagonal elements of a software design matrix of a software design equation.

According to another aspect of the invention, a method is provided for developing software, comprising acts of determining a coupling between a plurality of elements of a software design and determining a sequence of testing of the plurality of elements based on the coupling. In one embodiment of the invention, coupling is determined by examining off-diagonal elements of a software design matrix of a software design equation.

According to another aspect of the invention, a method is provided for reverse-engineering a plurality of computer-based instructions. The method comprises: a) determining, during a first parse of a first source code, a structure of at least two object-oriented software objects represented by the code, b) determining, during a second parse of the first source code, a relationship between objects, and c) determining, according to acts a) and b), a representation of the first source code in a design equation relating design goals and implementation of the design goals in a design matrix.

According to another aspect of the invention, a method for designing object-oriented software is provided, the method comprising providing a software design matrix describing a relationship between one or more functional requirements and one or more design parameters and identifying at least one object-oriented class as being defined by a portion of the software design matrix.

According to another aspect of the invention, a method for designing software is provided comprising identifying one or more functional requirements of the software, identifying design parameters to meet the functional requirements and decomposing the functional requirements and the design parameters.

According to another aspect of the invention, a method for designing software is provided comprising representing a software system in a design matrix relating design goals and implementation of the design goals and linking the design goals to the implementation, wherein a change in the design goals produces a change in the implementation.

According to another aspect of the invention, a method for designing software is provided comprising representing a software system in a design matrix having a plurality of elements, the design matrix relating design goals and implementation of the design goals and identifying a portion of the software system that is suitable for reuse by identifying one or more elements that are independent of other elements in the design matrix.

Further features and advantages of the present invention as well as the structure and operation of various embodiments of the present invention are described in detail below with reference to the accompanying drawings. All references cited herein are expressly incorporated by reference.

BRIEF DESCRIPTION OF THE DRAWINGS

This invention is pointed out with particularity in the appended claims. The above and further advantages of this invention may be better understood by referring to the following description when taken in conjunction with the accompanying drawings in which similar reference numbers indicate the same or similar elements.

In the drawings,

FIG. 1B is a block diagram showing different types of design matrices;

FIG. 4 shows an example design equation according to one embodiment of the invention;

FIGS. 6A-6C show steps involved in processing code in accordance with various embodiments of the invention;

FIG. 9A is an example of a design equation according to one embodiment of the invention;

FIG. 9B shows a conventional flow diagram associated with the design equation of FIG. 9A;

FIG. 9C shows a Gantt chart associated with the flow chart in FIG. 9B;

FIG. 10A shows an example of a design equation according to one embodiment of the invention;

FIG. 10B shows a flow diagram associated with the design equation of FIG. 10A in accordance with one embodiment of the invention;

FIG. 10C shows a Gantt chart associated with the flow chart of FIG. 10A;

FIG. 11 shows an example of a design equation;

FIG. 15 is a diagram illustrating an example design decision process according to one embodiment of the invention;

FIG. 17A is an example of a high level design equation illustrating a sequence of implementation and testing of elements according to one embodiment of the invention.

DETAILED DESCRIPTION

A method is provided for determining a sequence of implementation of elements of a software design. The sequence of implementation may be determined by examining coupling between the elements. Further, a method for determining a sequence of testing of elements of the software design is provided which may also be determined by examining coupling between the elements.

Further, a method is provided for reverse engineering a design of previously-implemented software, and to identify coupling in the software. Because a developer can determine the degree of coupling of the software, the software may be more easily modified, maintained, evaluated, and combined into larger software systems.

Also, because coupling may be identified, elements of the design may be more easily grouped into object-oriented classes based on the identified coupling. Further, existing object-oriented designs may be evaluated based on the degree of coupling.

New Design Methodology

A new software design methodology is provided for use in designing software that overcomes the shortcomings of various software design strategies, such as high degree of coupling, extended development time, and high cost. There is a need to overcome many of the shortcomings of current software design techniques including high maintenance costs, limited reusability, the need for extensive debugging and testing, poor documentation, and limited extensibility of the software, all of which result in high development cost of software. A design framework that identifies coupling in software allows a programmer to reduce the overall cost of programming.

For example, axiomatic design principles have been used conventionally to design mechanical systems, and these principles may be adapted to identify coupling in software-based systems. Axiomatic design principles are described in detail in "The Principle of Design," by Nam P. Suh, Oxford University Press, 1990, which is hereby incorporated by reference in its entirety. Although axiomatic design principles may be used to identify coupling, it should be appreciated that other software design methods may be used to identify coupling, and the invention is not limited to any particular implementation.

Applying axiomatic design principles to software design, a software designer or developer describes their software based on features which depend on the programming language or software design methodology. Axiomatic design principles as related to software design is described generally in the book entitled "Axiomatic Design Advances and Applications" by Nam Pyo Suh, Oxford University Press, New York (2001), and U.S. application Ser. No. 09/731,678 filed Dec. 6, 2000 entitled "METHOD AND APPARATUS FOR PRODUCING SOFTWARE" of which the present application is a continuation. Both references are hereby incorporated by reference in their entirety.

Figure 1A:
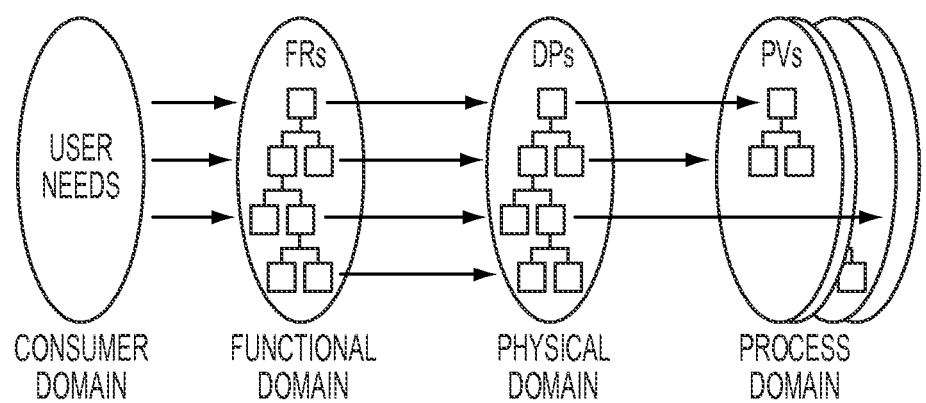
FIG. 1A is a block diagram illustrating concepts of domain, mapping and spaces.

Axiomatic design methodology combines the concept of "what we want to achieve" and "how we want to achieve it" and is represented as a single concept in terms of axiomatic design. In particular, axiomatic design defines a concept of domains which isolates representation of the software system. A domain termed the functional domain captures the concept for "what we want to achieve" and indicates as elements of the domain a set of functional requirements (FRs). The physical domain represents "how we want to achieve it" and indicates as elements of the domain a set of design parameters (DRs). Two other domains exist. One is the customer domain which captures customer needs (CNs) defining customer requirements of the software system. The other is a domain termed the process domain that represents process variables (PVs) defining the existing environment in which the software system operates. These domains are illustrated in FIG. 1A. By using FRs and DPs to describe software, a software designer can create a clear description for their software.

The specific nature of CNs, FRs, DPs and PVs of a software design depends upon the specific nature or goals of the software:

CNs: Users' needs or customer attributes which the software program must satisfy.

FRs: Outputs or the specifications or the requirements of a program code or software component or a system.

DPs: (1) Inputs or components in case of pure algorithms or (2) Hardware such as sensors, ASICs (application specific integrated circuits), or other hardware that interface with software systems.

PVs: Program code (source code including subroutines, components, or the like, or machine code) or compilers.

A design equation may be used to describe a relation between FRs and DPs. A design equation includes a set of FRs, a set of DPs, and a design matrix which shows the relationship between FRs and DPs. The design equation can be represented as Equation (1) in mathematical manner, and may also be expressed as a function of attributes, methods and classes. If the design matrix is diagonal, each of the FRs can be satisfied independently by means of one DP. That is, there is a one-to-one correspondence between FRs and DPs. Such a design is called an uncoupled design. Otherwise, the design is a coupled design. However, if the design matrix of a coupled design shows a correspondence between FRs and DPs only on or below the diagonal of the matrix or if the design matrix shows a correspondence between FRs and DPs only on or above the diagonal of the matrix, the design is a special case of a coupled design, called a decoupled design. In the case where the correspondence between FRs and DPs are only on or below the diagonal of the matrix, the matrix is termed a lower triangular matrix. In the case where the correspondence between FRs and DPs are only on or above the diagonal of the matrix, the matrix is termed an upper triangular matrix. FIG. 1B shows these different types of designs. If the design matrix for the software is uncoupled or decoupled, it guarantees a non-iterative implementation path or testing path. These paths facilitate the development of software, even when programmers of lesser experience are implementing the design.

Figure 1C:
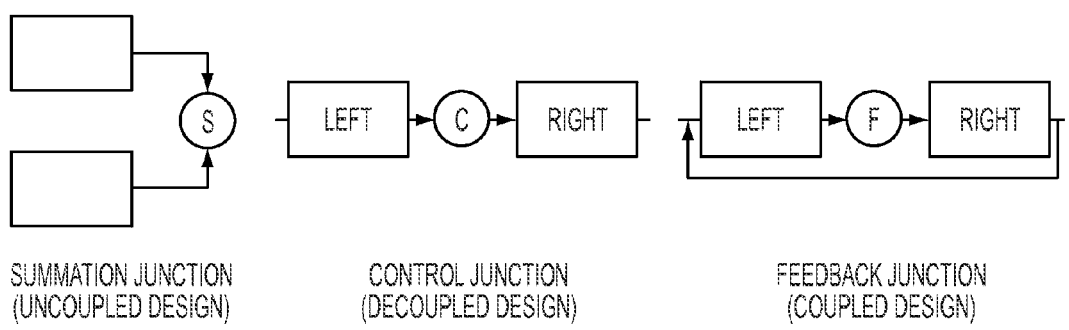
FIG. 1C is a block diagram showing different types of junctions.
Figure 1D:
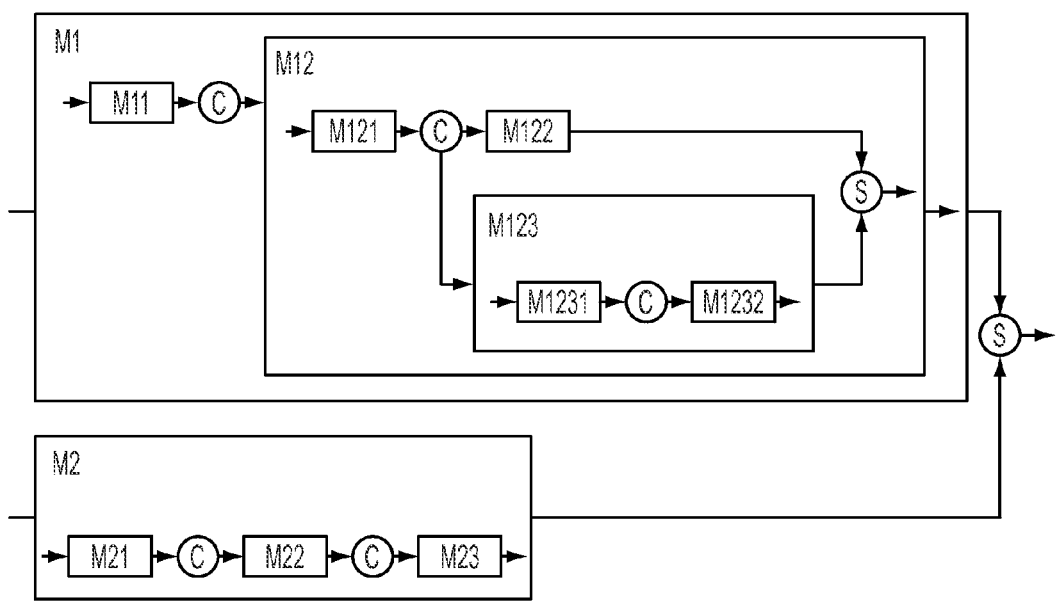
FIG. 1D is a block diagram showing different types of system architecture.

FIG. 1C shows several different junction types through which components may be connected, these junctions representing relationships between components. Different junctions are used to relate components depending on how they are related through the design matrix. Using such a flow chart, it is much easier to follow changes during the development and maintenance processes. Because the developer or manager knows how the software components interact and which component should be checked if a change is made, maintenance cost is reduced. FIG. 1D shows an example system architecture utilizing different junction types illustrated in FIG. 1C.

$$\{FRS\} = [A]\{DPs\} \quad (1)$$
$$= \{\text{class } x\}$$
$$= [\text{methods}]\{\text{attributes}\}$$

$$[A] = \begin{bmatrix} A11 & A12 & A13 \\ A21 & A22 & A23 \\ A31 & A32 & A33 \end{bmatrix}$$

$$A_{ij} = \frac{\partial FR_i}{\partial DP_j}$$

General Purpose Computer System

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to design software. Further, the software design system may be located on a single computer or may be distributed among a plurality of computers attached by a communications network.

A software design system according to one embodiment of the invention is configured to perform software design of object-oriented software systems. It should be appreciated that other types of software design may be performed, including a real-time software design and design of non-object-oriented code.

Figure 1E:
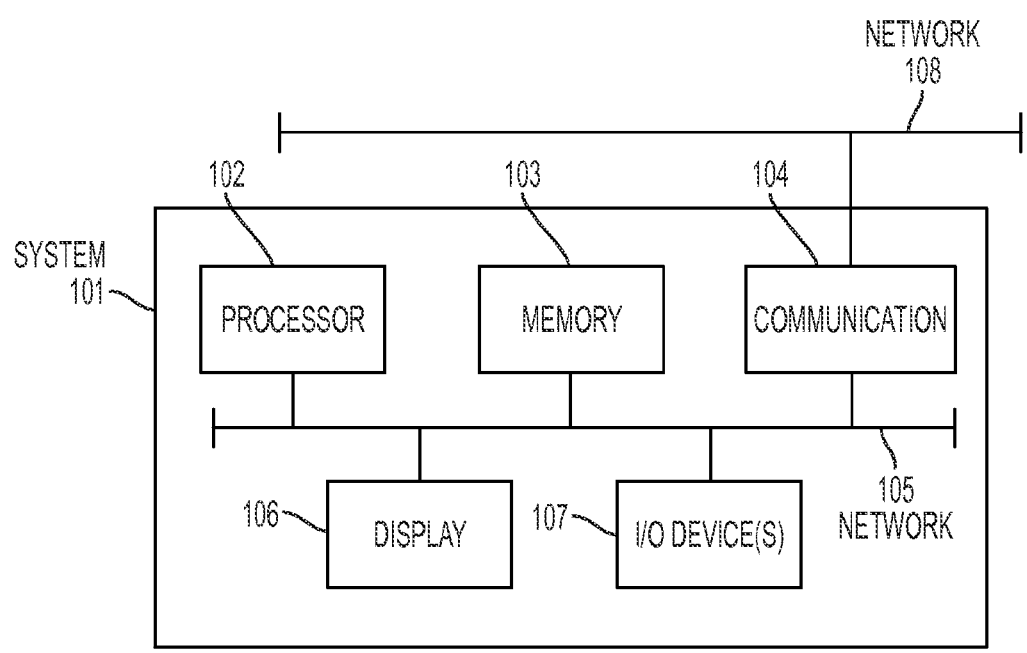
FIG. 1E shows a general purpose computer system upon which various embodiments of the invention may be practiced.

For example, the software design system may be implemented as specialized software executing in a general-purpose computer system 101 such as that shown in FIG. 1E. The computer system 101 may include a processor 102 connected to one or more memory devices 103, such as a disk drive, memory, or other device for storing data. Memory 103 is typically used for storing programs and data during operation of the computer system 101. Devices in computer system 101 may be coupled by a communication device such as network 105. Computer system 101 also includes one or more input/output devices 107, such as keyboard, mouse, or printing device. In addition, computer system 101 may contain one or more communication devices 104 that connect computer system 101 to a communication network 108.

Computer system 101 may be a general-purpose computer system that is programmable using a high-level computer programming language. Computer system 101 may be also implemented using specially programmed, special purpose hardware. In computer system 101, processor 102 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

Various embodiments of the present invention may be programmed using an object-oriented programming language, such as SmallTalk, JAVA, C++, Ada, or C# (C-Sharp). Other programming languages may also be used. Alternatively, functional, logical, or imperative programming languages may be used. It should also be appreciated that one or more portions of the software design system may be distributed to one or more computers (not shown) coupled to communications network 108. These computer systems may also be general-purpose computer systems.

It should be understood that the invention is not limited to a particular computer system platform, processor, operating system, or network. Also, it should be apparent to those skilled in the art that the present invention is not limited to a specific programming language or computer system and that other appropriate programming languages and other appropriate computer systems could also be used.

Reverse Engineering of Previously-Developed Software

Often it is desirable to reuse components of previously-developed software or to modify previously-developed software to include new features. As discussed, conventional software systems are generally coupled systems that have feedback between components. Thus, it is typically difficult to extend the previously-developed software because, in a system having feedback, a change in one component may have an adverse affect on the operation of another component or system. In some cases, new software must be developed to incorporate new features as previously-developed software cannot be extended easily. To resolve coupling in systems, the relationship between each individual feature should be checked and this checking requires detailed information regarding the system. Conventionally, system analysis and design is performed by a designer or programmer. Designers or programmers use their experience and intuition in programming in an ad-hoc manner.

Axiomatic design provides design tools which allow a user to populate an axiomatic design equation to determine coupling between elements of a previously-developed software system. By using these axiomatic design tools, creating or extending a software system is straightforward.

Figure 2:
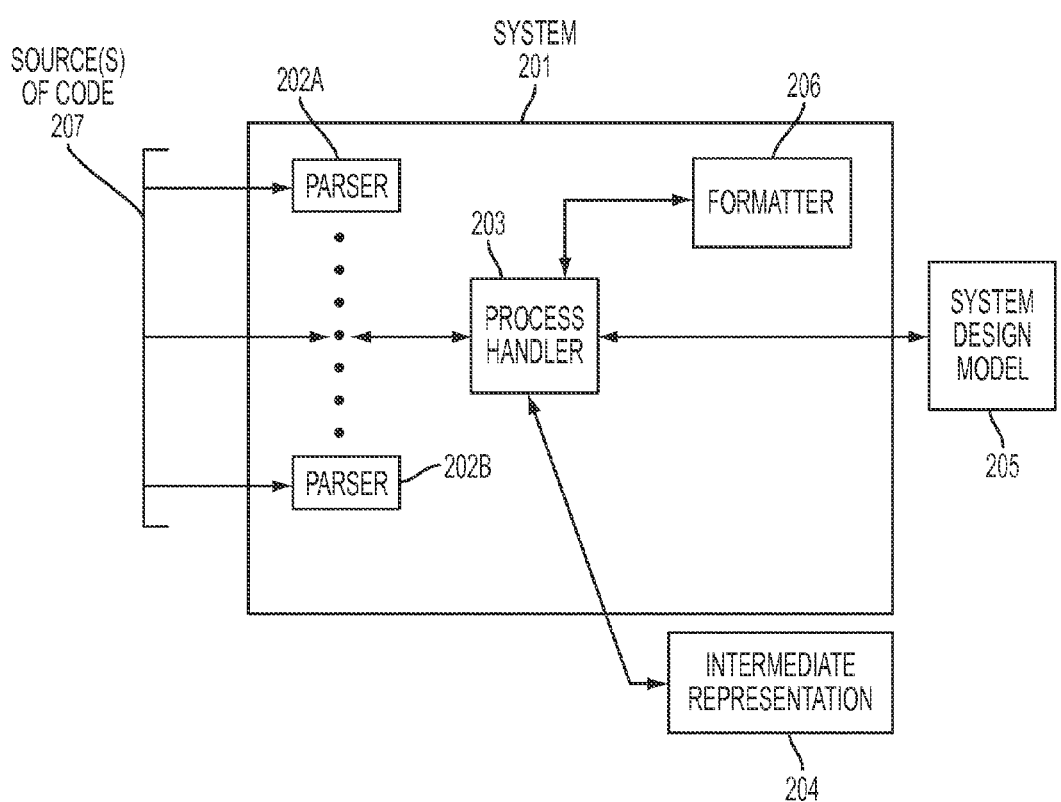
FIG. 2 shows a system capable of reverse engineering a source of code in accordance with one embodiment of the invention.

FIG. 2 shows a reverse engineering system 201 which may, for example, be part of a software design system residing on a general-purpose computer system as discussed above with reference to FIG. 1E. System 201 may receive a source of code 207, the source of code being compiled code, source code, descriptions of code or the like. For example, a source of code may be software programmed in one or more objected-oriented program languages such as C++ and Java, for example. Also, a source of code 207 may include documentation which describes a structure of objects and their relationships. For example, documentation may be in the form of markup language documents such as HTML, XML, XMI, Java bytecode, or any other format. System 201 may include one or more parsers 202A-202B which parse the sources of code 207 and analyze structures located within these sources. Parsers 202A-202B provide information to a process handler 203 which intermediates between components of system 201. Process handler 203 may be, for example, a software program executed in memory of a general-purpose computer system as described above with respect to FIG. 1E. Process handler 203 identifies structure of code 207 and relationships between elements of the code and information that can be used to generate a system design model 206. The model could be, for example, a design equation or design matrix which relates functional requirements of the source of code to design parameters.

According to one aspect of the invention, process handler 203 creates, in the design matrix, a hierarchy of elements which relates to the objects discovered by parser 202. In particular, a parser may perform one or more passes on source of code 207, and identifies object-oriented object structures, relationships between the objects, and other related information with respect to the source of code. These objects and their relationships are illustrated in the design matrix 205 as discussed further below with reference to FIG. 2. Process handler 203 may also produce, from code 207, an intermediate representation 204 of the code 207. Intermediate representation 204 may be stored, for example, in a memory associated with system 201 such as a disk, memory device, network storage, or in any other storage location accessible by system 201. For example, various examples of the embodiment are discussed in more detail below with reference to FIG. 7A and FIG. 7B. This intermediate representation may be a data structure stored in memory of the general purpose computer system or may be stored in a database associated with system 201. According to one embodiment of the invention, the intermediate representation is an object-oriented structure that stores object class and relationship information. This information may be obtained by analyzing source of code 207.

System 201 may also include a formatter 206 which produces an output code having a variety of formats. Output code formats 208 may include code skeletons, code descriptions, or any other format used to define or describe code.

Figure 3:
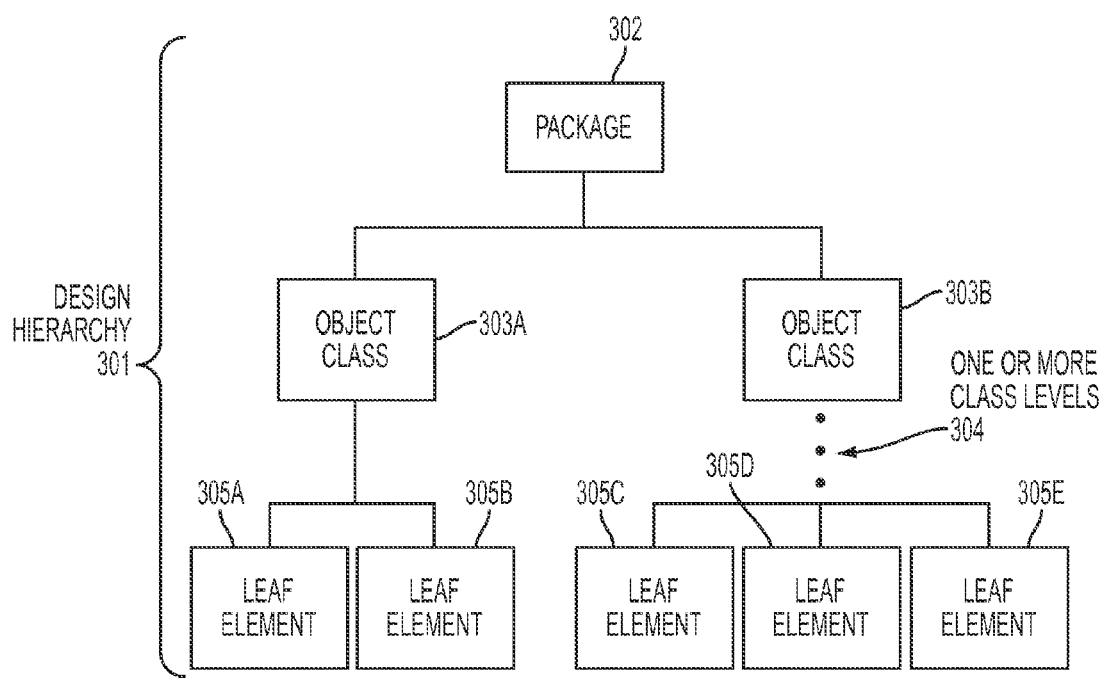
FIG. 3 shows an example package hierarchy represented by FR/DP pairs in accordance to one embodiment of the invention.

FIG. 3 shows a design hierarchy 301 in an axiomatic design. Axiomatic design principles are more thoroughly discussed in the patent application entitled "Method and Apparatus for Producing Software" filed Dec. 6, 2000 under Ser. No. 09/731,678 by Sung-Hee Do et al., the contents of which are incorporated by reference in their entirety. Design hierarchy 301 includes a top level hierarchy referred to in the programming art as a package 302. Packages 302 include one or more objects classes 303A, 303B. At the bottom of the hierarchy 301, there are what are referred to in axiomatic design as leafs 305A-305E which correspond to elements within a design equation that are not further decomposed into smaller objects. According to one aspect of the invention, leafs are determined when a design parameter that meets a functional requirement defines data, a variable, or a method, such as in the axiomatic design context.

Process handler 203 recognizes hierarchical relations within source of code 207 and produces a design hierarchy 301 that reflects the object structure. The object and leaf information is represented in a design equation according to the hierarchy 301. The representation of object and leaf information will be discussed below in detail. In general, each element in the design matrix can be a method in terms of an object-oriented method, or a relationship between attribute and method, method and method, or class and class. Once objects are recognized in the source of code and are defined in the design equation, attributes (or data) and operations (or methods) are defined to determine the object hierarchy within the design equation.

Figure 5:
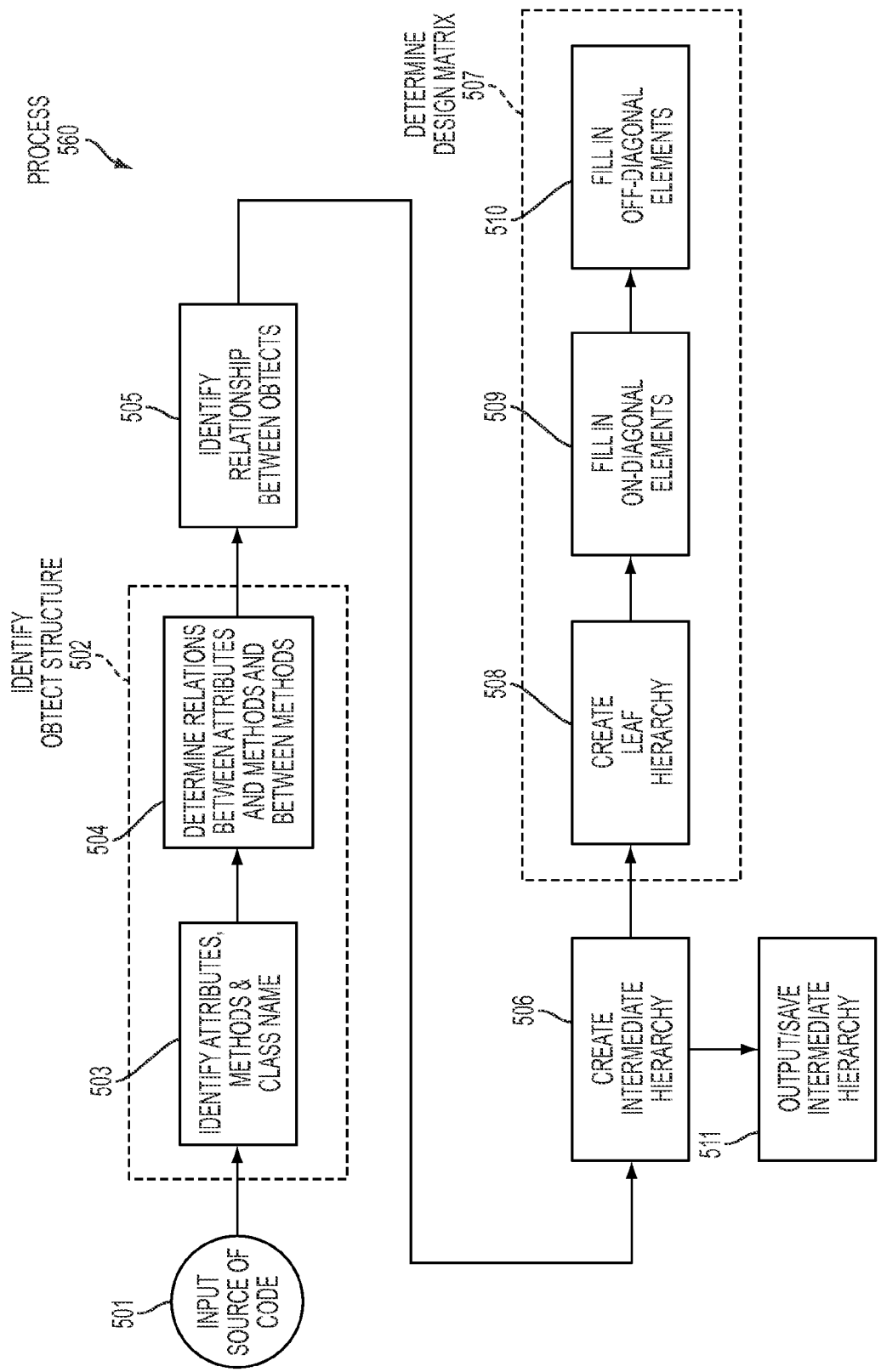
FIG. 5 shows a process for reverse engineering code according to one embodiment of the invention.

FIG. 5 shows a process for reverse engineering code according to one embodiment of the invention. More particularly, process 500 may be performed, for example, by system 201, which may be associated with the software design system executing on one or more general-purpose computer systems. At block 501, a source of code is input to the reverse engineering system. System 201 parses the code and determines the object structure at block 502. More particularly, system 201 may identify attributes, methods, and class names associated with one or more objects within the input source of code at block 503. At block 504, system 201 may determine the relations between attributes and methods of particular objects and also relationships between methods, these methods existing within the same object or within different objects. These relations include method calls between methods and how methods relate to attributes (or data). At block 505, system 201 identifies relationships between objects, these relationships including inheritance, aggregation, and the like. Blocks 503-505 may be executed, according to one embodiment of the invention, as part of a three-pass parsing procedure wherein the processes performed in blocks 503, 504 and 505 are performed in series.

Once the object structure and the relationship between objects have been identified, this information may be used to create an internal or intermediate representation of the code or may be stored directly in the design matrix. At block 506, system 201 may create an intermediate hierarchy which may be, for example, an object-oriented data structure stored in memory which contains object structure and relations between objects. Information with respect to objects gained through parsing the input source of code is mapped into the immediate hierarchy, and from this intermediate hierarchy, class information can be output to a storage medium, transferred to another computer process or system, or saved at the software design system at block 511. A format of the intermediate hierarchy may itself serve as a common format that can be used to exchange object information between systems.

As discussed above, object structure and relationship data may be represented within a design equation. As shown in FIG. 5, system 201 may determine a design matrix at block 507. According to one embodiment of the invention, system 201 performs a series of steps to create the design hierarchy. More particularly, at block 508, system 201 creates a leaf hierarchy in the design matrix. Leafs are created according to the class structures identified in the input source of code. According to one embodiment of the invention, functional requirements associated with elements that are placed in the design matrix are arbitrarily assigned. Because functional requirements are usually provided by an analyst to describe real-world requirements of the functions that a particular software element needs, these descriptions may be arbitrarily designed in design matrix when the first source of code is analyzed, and these descriptions may be filled in later, for example by a programmer or software architect. In a sense, a user can work backwards from an existing source of code and determine one or more functional requirements based on the functionality that the software element actually meets.

At block 509, system 201 may fill in elements which are located on a diagonal of the design matrix. These on-diagonal elements are defined by class structures recognized from the input source of code. At block 510, off-diagonal elements of the design matrix are filled in, these off-diagonal elements being determined by the identified relationships between objects. That is, off-diagonal elements define interactions between on-diagonal elements. Once the on-diagonal and off-diagonal elements are determined for the design matrix, this representation of on-diagonal and off-diagonal elements may be manipulated within the design system. More particularly, the design may be improved, additional functional requirements and design parameters may be added, additional sources of code may be imported into the same design matrix to extend and build upon the representation of the first source of code.

FIGS. 6A-C show steps involved in processing a source of code in accordance with various embodiments of the invention. In particular, FIG. 6A shows a first step wherein a source of code is scanned (parsed) to determine attribute and method information. As shown in FIG. 6A, a source of code called "Code.Java" is a Java source code document that defines a package referred to as ADS-FR5_AD_modeler.FR53_reverse engineering. During a first pass, the parser determines elements of the code such as the package, the package name, the classes, attributes, and methods. This discovered information may be stored in the intermediate hierarchy, the design equation, or any other storage structure. As shown in FIG. 6A, the reverse engineering system 201 determines that there is a public class Code, having an attribute status_, a creator method Code, and a method setType. This information may be stored in a data structure as shown in FIG. 6A which describes the recognized classes, attributes, and methods.

During a second pass, as shown in FIG. 6B, the input file is scanned to capture relationship information between attributes and methods and between methods within the class. For example, as shown in FIG. 6B, the source of code file called Code.Java is processed to determine relationships between the recognized attributes and the recognized methods and relationships between the recognized methods. For example, for a creator method Code, attributes status_, type, name_, comment_, are each associated with the creator method Code. Similarly, if a method refers to another method, this information is also stored. For example, the method Sibling_FR4__1 refers to another method clean Data, and this information is stored, for example in the intermediate representation as dependency information.

In a third pass as shown in FIG. 6C, system 201 scans the input source of code to determine dependencies between classes. A dependency is defined generally as a semantic relationship between two entities, in which a change in one entity (an independent entity) may affect the semantics of the other entity (the dependent entity). As is shown in FIG. 6C, input source of code Code.Java is analyzed to determine relationships such as extended classes, inheritance, aggregation, superclasses, subclasses, function calls, and other object relationships. This information may be stored, for example, in the intermediate representation as dependency information. Thus, any dependency relationship information may be stored in the intermediate representation 204.

As discussed above with reference to FIG. 2, intermediate representation 204 may be, for example, an object-oriented structure maintained in a memory associated with design system 201. More particularly, the intermediate representation 204 may have a class structure such as that shown in FIG. 7A. Objects recognized within the code may be stored in a data structure such as a linked list which contains, for example, all of the objects associated with a particular package. More particularly, an object sibling_FR4_1 may be used to represent the package and to reference and store objects recognized in the source of code. The class structure also includes a ClassInfo class which stores attributes and methods of the code. The class structure also includes code object which stores information described in the code, a dependency object which indicates dependencies between classes and a MethodInfo object 705 which stores relations between attributes and methods and relations between methods.

Figure 7A:
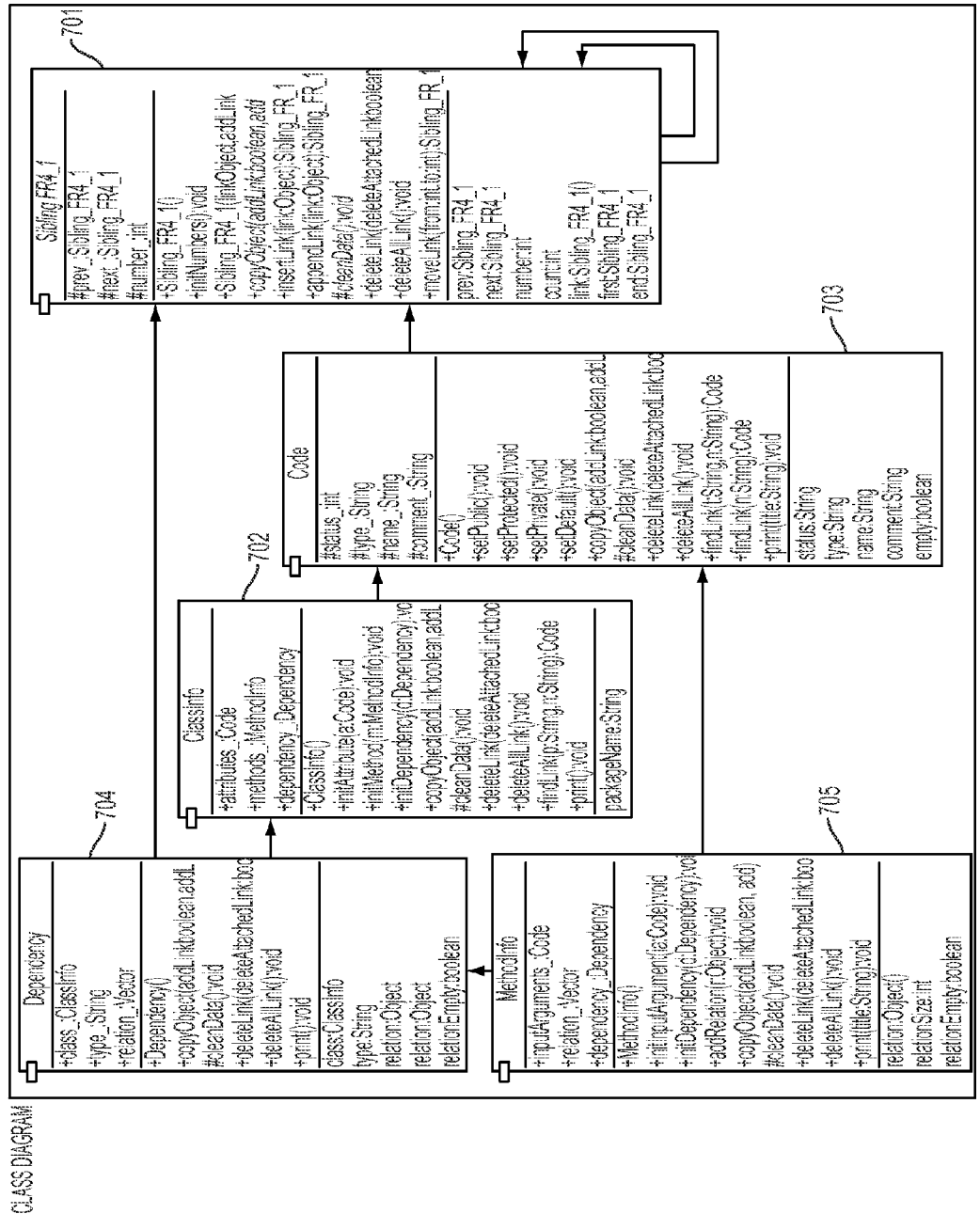
FIG. 7A shows a class structure of an internal representation in accordance with one embodiment of the invention.
Figure 7B:
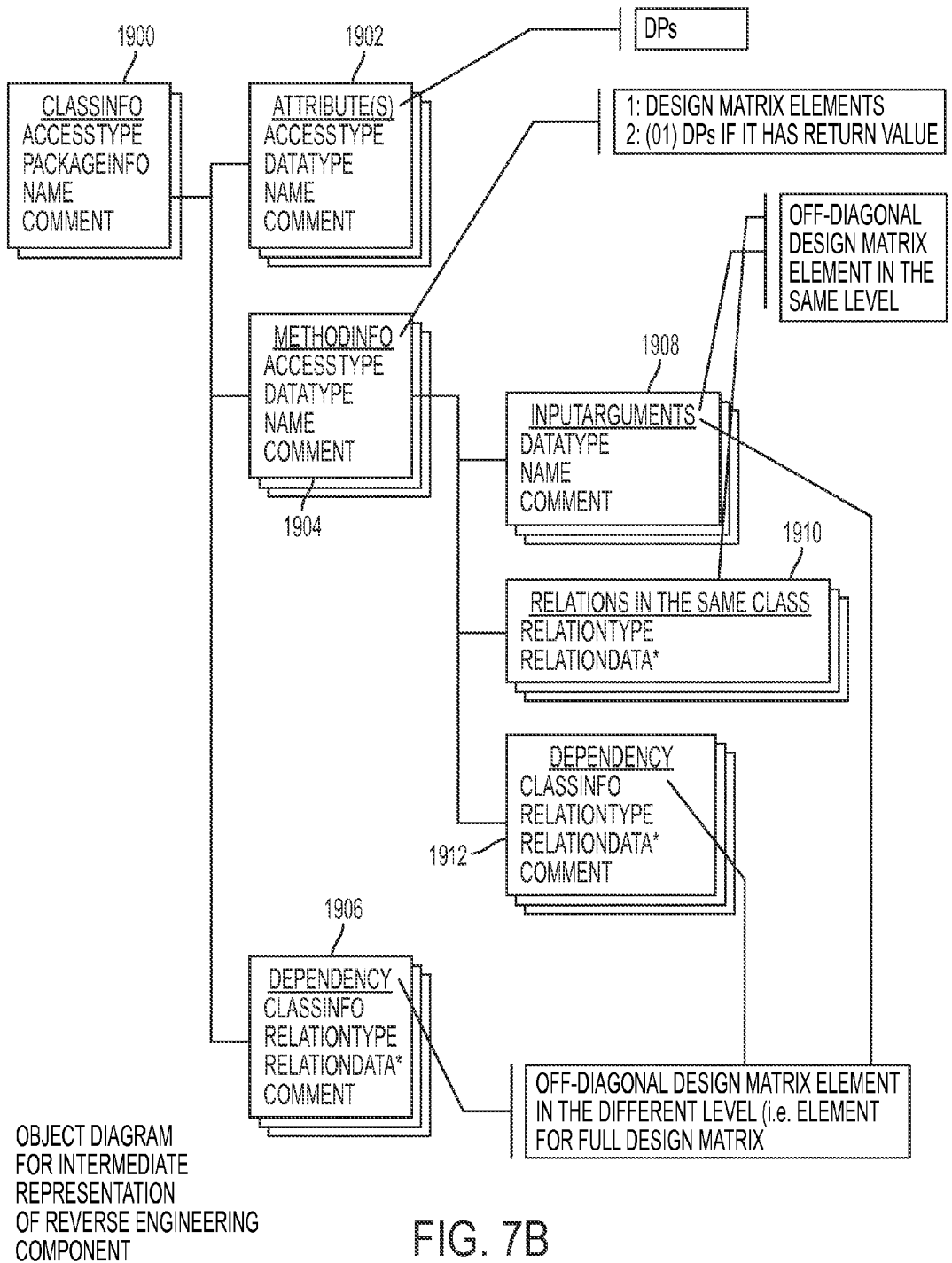
FIG. 7B is an example of an object diagram of a data structure according to one embodiment of the invention.

FIG. 7B shows an example object diagram based on the class structure shown in FIG. 7A. More particularly, each instance of the ClassInfo class 1900 stores information about a particular class in the source code. Information about the attributes or data members of a class are stored in a Code object 703, shown in FIG. 7A. Attributes of a class may be represented as design parameters in a design equation. Information about methods of a class represented by ClassInfo 1900 are stored in a MethodInfo object 1904. Each MethodInfo object 1904 has a reference to a dependency object 1912 and dependency object 1906. Dependency object 1906 includes class relationship information and dependency object 1912 includes a method or attribute call chain, which defines the chain of methods that are called when a particular method is invoked. There may be one dependency object referenced for each dependency relationship of the method or there may be one dependency object referenced which contains information about all the dependencies of a method. The information stored in these dependency objects may represent elements in a design matrix that are on a different level than the method which depends on them. Dependencies of the method at the same level may be stored, for example, in the Input Arguments field of the Relations field of the MethodInfo class.

Thus, according to one embodiment of the invention, when an input source of code is analyzed and placed in an object-oriented structure of an intermediate representation describing the code, the intermediate representation may include linked list of objects, the objects describing objects recognized within the source of code and indicating attributes, methods and their relations and dependencies between classes. It should be appreciated that other data structures may be used to store objects, and the invention is not limited to any particular implementation.

Figure 8:
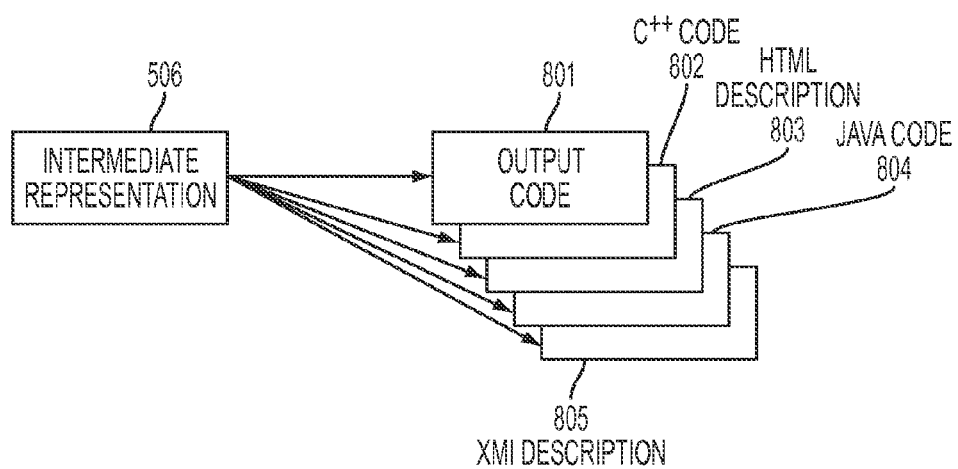
FIG. 8 shows various output possibilities of a reverse engineering system according to various embodiments of the invention.

Using this intermediate representation that describes the code, software design system 201 may generate any one of a number of output code formats 801-805 from the intermediate representation 506 as shown in FIG. 8. For example, using the structure stored in the intermediate representation, a C++ code file 802 may be generated which reflects the object structure. Similarly, code written in a number of any other languages such as the JAVA programming language or any other language may be generated. Further, documentation describing the code may also be generated in any number of formats. For example, an HTML description 803 may be generated which is a file in HTML format that describes the structure of the code. Further, the intermediate representation may be output to common software design formats such as XMI used by various systems, and this intermediate representation may be used to exchange information between software design systems. It should be appreciated that other formats may be used to describe code.

Identification of Object Structure

Figure 4:
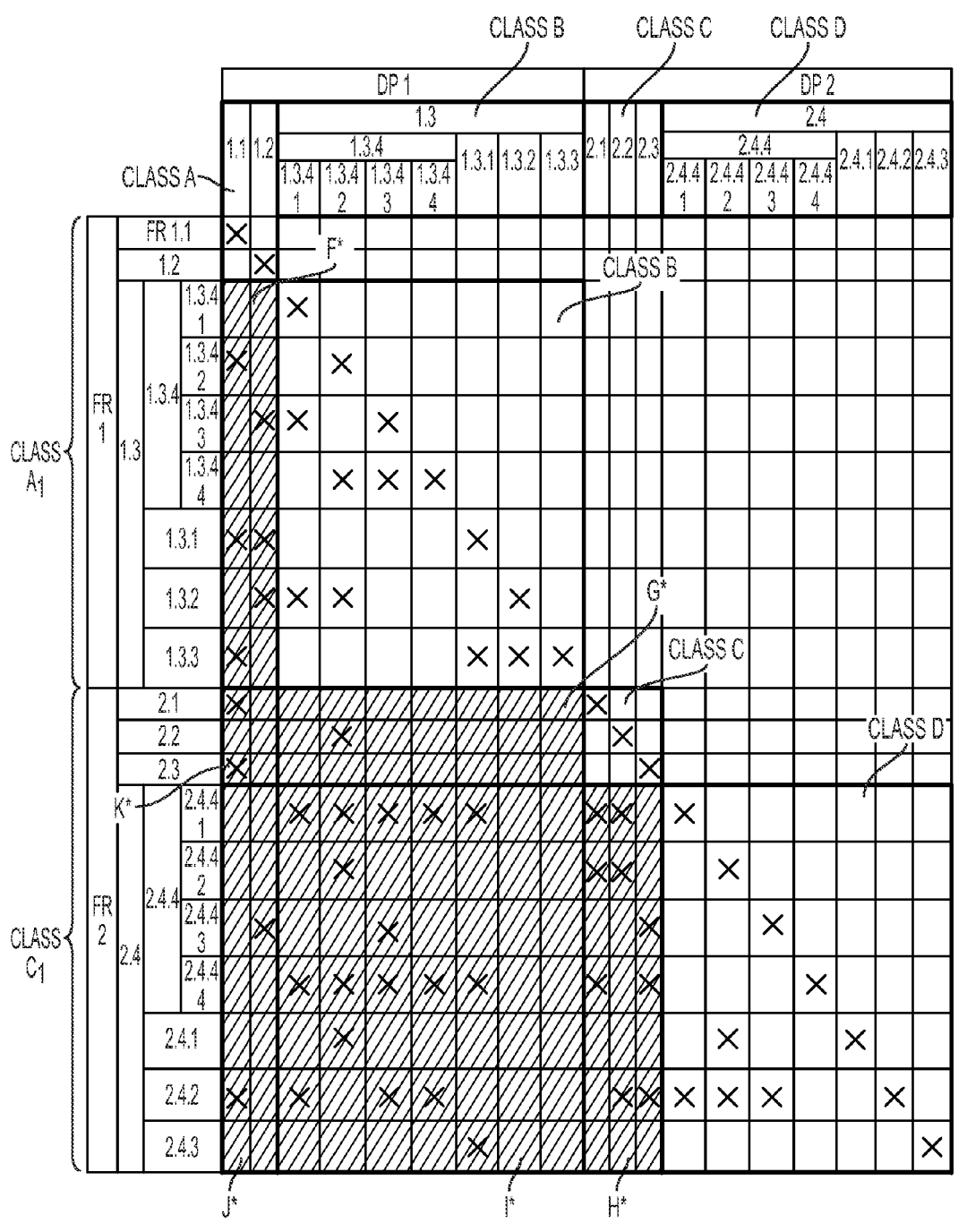

As mentioned previously, a design equation may be used to aid the programmer in identifying object-oriented classes to include in a software design. FIG. 4 shows a method for identifying object-oriented classes from a software design matrix according to one embodiment of the invention. In this example, a top-level functional requirement 1 (FRI) is decomposed into three lower-level functional requirements, labeled 1.1, 1.2, and 1.3. Functional requirement 1.3 is further decomposed into four lower-level functional requirements, labeled 1.3.1, 1.3.2, 1.3.3., and 1.3.4. Functional requirement 1.3.4 is further decomposed into four lower-level functional requirements, labeled 1.3.4.1 through 1.3.4.4. Lower-level functional requirements are more specific than their parents.

For example, if the software design equation shown is a design equation for accounting software, one top level functional requirement might include the requirement of keeping track of employees on the payroll. This functional requirement may be decomposed into several more specific functional requirements such as, for example, keeping track of each employees salary, keeping track of tax-exempt status of each employee, keeping track of miscellaneous personal information of each employee, etc. Similarly, these lower-level functional requirements may be decomposed into even more specific functional requirements. At each level of decomposition, design parameters are chosen for each of the functional requirements. For example, a design parameter for the high level functional requirement of keeping track of employees on the payroll might be a database with a record for each employee.

According to one embodiment of the invention, a method for stopping a decomposition process is provided. More particularly, when a design parameter can be directly mapped to either a data member of an object-oriented class or the output of a method in an object-oriented class, then the designer knows that he has reached a terminal level or "leaf" level functional requirements and design parameters, and the designer can then stop the decomposition process. For example, if the designer decides that one design parameter will be a variable to store an employee's birthday in an employee record, then the birthday could be represented as an integer or a string as a data member inside an object-oriented class. At this point, the designer can stop the decomposition process for the functional requirement to which that design parameter corresponds. Using FIG. 4 as an example, when functional requirement 1.1 is fully decomposed, design parameter 1.1 can be directly mapped to either a data member in an object-oriented class or the output of a method in an object oriented class. If design parameter 1.1 does not meet this requirement, then functional requirement 1.1 must be further decomposed in a manner similar to functional requirement 1.3.

Using terminal level functional requirements and design parameters, object-oriented classes may be identified. In one example, shown in FIG. 4, classes may be determined based on mappings between certain functional requirements and design parameters at least one level above the terminal level. These mappings can then be grouped into a sub-matrix of the design matrix and grouped into object-oriented classes. For example, Class A includes mappings between functional requirements 1.1 and 1.2 and design parameters 1.1 and 1.2. Class A thus maps design parameters and functional requirements one level above the terminal level. However, the sub-matrix mapping only functional requirement 1.1 and design parameter 1.1 is not a candidate for an object-oriented class because the sub-matrix exists only at the terminal level. Accordingly, Class A includes design parameters 1.1 and 1.2, the mapping between functional requirement 1.1. and design parameter 1.1, and the mapping between functional requirement 1.2 and design parameter 1.2.

According to one embodiment of the invention, any sub-matrix mapping functional requirements and design parameters from the same level and one level above the terminal level is a candidate for an object-oriented class. For example, Class B is a candidate for an object-oriented class because it is derived from the sub-matrix containing functional requirement 1.3 and all of its lower-level functional requirements, and design parameter 1.3 and all of its lower-level design parameters.

Another candidate for an object-oriented class is the combination of Class A and Class B, shown in FIG. 4 as Class $A_1$. A sub-matrix of Class $A_1$ maps functional requirement 1 and all of its lower-level functional requirements to design parameter 1 and all of its lower-level design parameters. Thus, Class $A_1$ includes all of these mappings as well as the lower-level design parameters of design parameter 1. A sub-matrix mapping non-contiguous functional requirements is not a candidate for an object-oriented class. For example, the sub-matrix mapping functional requirements 1.1, 1.2, and 1.3.4 to corresponding design parameters is not a candidate for an object oriented class because it maps two functional requirements from the second level of decomposition and one functional requirement from the third level of decomposition. Thus, this sub-matrix should map functional requirement 1.3 and all of its lower-level functional requirements to be a candidate for an object-oriented class.

In one embodiment of the invention, the design matrix comprises on-diagonal classes and off-diagonal elements. A class is said to be on-diagonal if its sub-matrix maps all the design parameters to their numerically corresponding functional requirements. For example, because on-diagonal Class C includes functional requirements 2.1, 2.2, and 2.3 in its mapping, it should also include design parameters 2.1, 2.2, and 2.3. Thus, the diagonal of the sub-matrices of the on-diagonal classes is a segment of the diagonal of the design matrix. Another method for determining if a class is on-diagonal includes determining whether the diagonal of the sub-matrix is a segment of the diagonal of the entire matrix. Choosing certain on-diagonal classes from the candidate classes defines the boundaries for off-diagonal elements. For example if a designer chose to incorporate on-diagonal classes Class A and Class B into his design, then another off-diagonal sub-matrix F* is defined by the boundaries of Class A and Class B. Because F* maps design parameters that influence the functional requirements of both Class A and Class B, sub-matrix F* illustrates a relationship between Class A and Class B. Thus, element F* is known as an object of Class A. However, if the designer chose to use one class, Class $A_1$ instead of Class A and Class B, then sub-matrix F* would not exist. Sub-matrices G* and H* shown in FIG. 4 are defined as a result of the choice to use Class C and Class D as two separate classes. Thus, sub-matrix G* shows the relationship between Class C and Class B. and is thus an object of Class B, and sub-matrix K* shows the relationship between Class C and Class A, and is thus an object of Class A.

As mentioned previously, off-diagonal elements show relationships between on-diagonal classes. One particular relationship that can be illustrated by off-diagonal sub-matices is a parent-child relationship. This relationship is commonly known as inheritance relationship in object-oriented programming. If, for example, the sub-matrix F* maps many of the design parameters that are mapped in the sub-matrix of Class A, as indicated by the number of markers, shown as X's in FIG. 4, in the class, then a designer might decide to make Class B a child class, or sub-class, that inherits from Class A. The design matrix illustrates that Class B accesses design parameters of Class A in order to satisfy certain functional requirements. By establishing a super-child relationship between Class A and Class B, Class B is provided with access to design parameters of Class A. If a designer chooses to use this relationship, he could, for example, define public and private data members and methods in Class A and then provide access to these data members and methods by using, for example, the Java keyword extends or the C++ notation for indicating inheritance. Any object-oriented language which provides support for inheritance may be used. Markers in the off-diagonal sub-matices that indicate this relationship may be colored differently than the other markers to make it clear to the designer that such a relationship could exist. Alternatively, the designer could select certain colors for class borders or markers that indicate he has chosen to implement F* as a parent-child relationship.

Another relationship that can be indicated by the off-diagonal sub-matices is an aggregation relationship. Using the design matrix, a designer can determine if one class requires use of data or methods from another class. For example, sub-matrix H* includes markers indicating that some of the design parameters of Class C affect the functional requirements of Class D. Instead of using an inheritance relationship, the designer might choose to aggregate Class C with Class D. That is, Class D would include a reference to Class C so that Class D can access the data contained in Class C. Similar to the inheritance relationship, this "has a", or aggregation, relationship may be indicated visually to a designed by displaying horizontal colored bands or colored markers to indicate where one class relies on data from another class.

A third type of relationship that may be indicated is an association relationship. The association relationship may be defined as a "uses a" relationship. That is, the dependent class uses another class in order to satisfy functional requirement. For example, sub-matrix I* indicates that Class D has a dependency on Class B. This dependency can be implemented using an association relationship. An association relationship could be implemented by a method in a dependent class receiving information, such as data parameters, from another class as an input. The relationship may also be indicated by the dependent class using a static method or static data of another class or by creating local class variables.

It should be appreciated that other relationship information may be contained and displayed in the design matrix in different manners, and the invention is not limited to the relationships and methods of indications disclosed herein.

Determining a Non-Iterative Implementation and Testing Sequence

In general, software development is a labor-intensive business. There are high labor costs associated with developing, debugging and maintaining software. Because every step in the software development life cycle is conducted sequentially, delays in one or more steps may drastically affect the overall development cycle. Conventional methods for developing software do not allow the developer to determine an efficient sequence of implementation. As previously discussed, these conventional methods are ad hoc methods that require the developer to modify previously written code based on changes or errors in subsequent code.

Such an ad hoc method is illustrated by the following example. For instance, a developer is coding accounting software that calculates weekly paychecks and tax withholdings of employees of companies. The software may include a back-end calculator component for calculating and outputting the desired values based upon salary and tax data stored in a database and a front-end graphical user interface (GUI) component for displaying the information to a user. Without first understanding the functional requirements of the software, i.e. calculating the amount of an employee's paycheck and tax withholdings and displaying that data in a graphical user interface, a developer may first implement a graphical user interface that displays an employee's name, social security number, and date of birth. The developer may then implement the calculator which calculates the desired paycheck and tax withholding data. At this point in the development, the developer may realize that he has programmed the GUI to display the wrong data and must modify the GUI component to display the correct data received from the calculator component. After modifying the GUI component, the developer may realize that he has altered the GUI component's interface to the calculator component and must go back and modify the calculator component to conform to the new interface. The new change in the calculator component may require another modification in the GUI component. Thus, the developer has entered into a iterative programming cycle, in which he must modify previously coded elements in response to changes made in other related elements. This iterative process produces software at a higher cost due to repeated modifications and testing of components.

One known method for developing software is the above-mentioned Unified Software Development Process (or Unified Process), which implements use cases in an iterative and incremental manner to develop software. In particular, there are a series of development iterations that lead to periodic builds, wherein different components are programmed and tested. Generally, to test the components at each iteration, supporting software or workaround must be provided to compensate for components that have not yet been programmed. The software is built up gradually and tested at each increment. This method of development often involves reworking and retesting developed components.

According to one aspect of the invention, iterative development may be avoided by identifying coupling between elements of the software application and implementing them based on the coupling. Two elements are said to be coupled if at least one dependency exists between them. A dependency may be, for example, one element requiring use of data or methods of another element or one element being dependent on the output of another element. In the accounting software example given above, the GUI component is coupled to the calculator component. That is, the GUI component has a dependency on the calculator component because in order to display the proper data, it must receive the data output by the calculator component.

Thus, as a result of this dependency, implementing the calculator component first will allow the developer to determine exactly what information the GUI component will need to display the proper data, including, for example, the type of data, the names of variables and the names of methods needed to access the data. The above example uses only two components, however in other more complicated examples there may be many more software elements. These elements may be high-level elements in the design such as, for example, object-oriented classes, software components, or software packages, or they may be lower-level elements, such as methods and data variables. By examining the coupling between each of these elements, a developer may determine a sequence for implementing these elements that reduces the time needed to go back and modify previously-implemented elements. Further, it can be appreciated that if previously-implemented elements are not modified, they do not have to be retested. Thus, the overall cost of development is reduced, as well as the amount of testing.

Tracking the dependencies between elements when a design consists of a small number of elements may be fairly simple, however, as mentioned above, a complex software design may include a very large number of elements and tracking them soon becomes difficult and unwieldy. Thus, another aspect of the invention provides a systematic method for tracking coupling between software elements.

One way to keep track of the coupling is by using a design equation which maps, in a design matrix, functional requirements of the design to the design parameters selected to meet those functional requirements. A design equation allows the developer to readily identify a non-iterative implementation path, that is, a sequence of implementation in which an element is only implemented after all the elements on which it depends, thus reducing the number times a developer must modify previously implemented code.

Also, by applying an axiomatic design equation, a programmer does not directly code first. Thus, debugging and testing can be minimized. In particular, the axiomatic design method permits a programmer to develop a logical design prior to coding the design. Detailed information for the design is defined during the design process. Therefore, the subsequent software coding is straightforward. If there is something wrong with the software design logic, a designer or programmer analyzes and revises the requirements which represents and determines the specific code. Also, the developed software can be tested with the FR's information step by step, because each of the FRs represent specific software requirements.

Figure 16A:
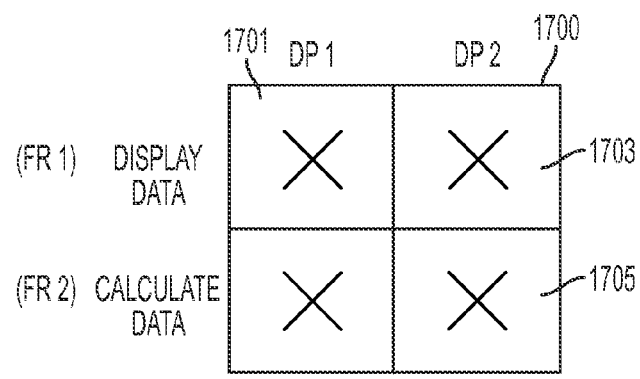
FIG. 16A is an example of a coupled design equation.
Figure 16B:
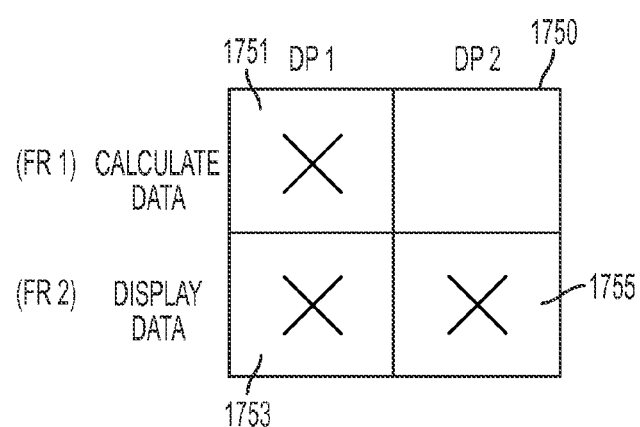
FIG. 16B is an example of a decoupled design equation.

FIGS. 16A and 16B show an example of a design equation for the accounting software application example described above. FIG. 16A shows a design equation 1700 that indicates a dependency between the two functional requirements labeled FR1 and FR2. That is, FR1 and FR2 are coupled. A developer may readily identify coupling by determining if any off-diagonal elements exist in the design matrix, such as off-diagonal element 1703. Off-diagonal element 1703 is located above the diagonal in the design matrix, indicating that a circular dependency exists, since FR1 depends on a design parameter (DP2) of FR2. This is type of design is called a coupled design since some elements are implemented before elements on which they have a dependency. This is illustrated by design equation 1700 in which the design matrix is neither a diagonal matrix, an upper triangular matrix, or a lower triangular matrix.

However, in many cases, a design equation may be modified to reduce the number of off-diagonal elements of a design matrix, particularly when the design is a coupled design. Switching the order of implementation of the functional requirements is one way to reduce the off-diagonal coupling which causes the design to be coupled. Another way of reducing this type of off-diagonal coupling, as shown in FIG. 16B, is choosing new design parameters to satisfy the functional requirements. The design matrix in FIG. 16B shows that off-diagonal element 1753 is located below the diagonal. Although FR2 depends on a design parameter of FR1, the design parameter, labeled DP1, is implemented before implementation FR2 begins. This is type of design is called a decoupled design because each element is implemented after all of the elements on which it has a dependency. This type of design is indicated in a design equation in which the design matrix is either an upper-triangular or lower-triangular matrix.

Figure 17A:
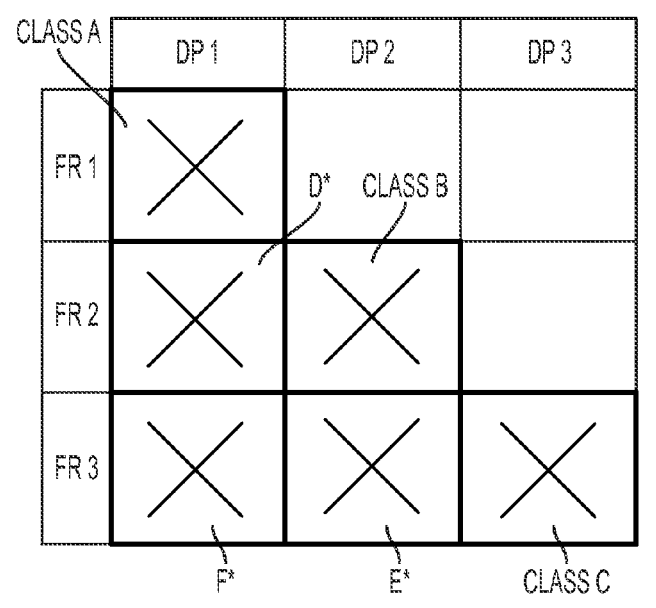

According to one aspect of the invention, a method is provided that allows a developer to determine, using a decoupled design, a non-iterative implementation sequence of elements of the software design. That is, each element is implemented after all of the elements on which the element depends are implemented. If the decoupled design is represented in, for example, a design matrix, the sequence of implementation is visible and can be easily extracted from the design matrix. FIG. 17A shows an example of high level design equation of a decoupled object-oriented software design. The design includes three on-diagonal classes, Class A, Class B, and Class C. The design also includes three off-diagonal sub-matrices D*, E* and F*. Sub-matrix D* indicates that there is a dependency of Class B on Class A. Sub-matrix E* indicates that there is a dependency of Class C on Class B, and sub-matrix F* indicates that there is a dependency of Class C on Class A.

Figure 17B:
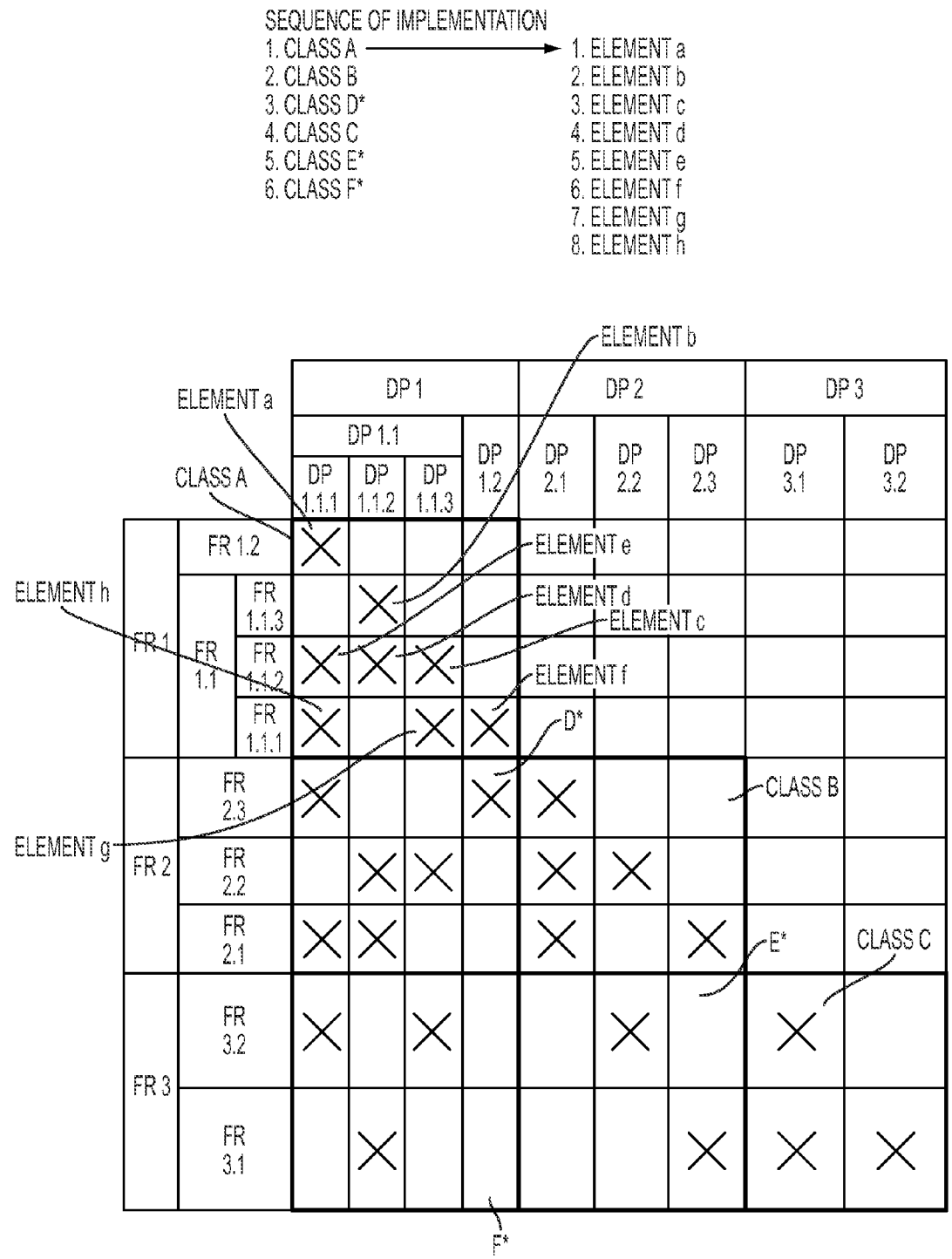
FIG. 17B is an example of the design equation of FIG. 17A in expanded form.

A developer can determine a non-iterative sequence of implementation based on this dependency information. In one embodiment, in order to determine the sequence of implementation, given a decoupled design with a lower triangular design matrix, the first element to be implemented is the top left on-diagonal element. The top left on-diagonal element is Class A. The next element in the sequence of implementation is an on-diagonal element of the next level. FIG. 17B shows the design equation of FIG. 17A in expanded form, that is, the lower levels of decomposition are shown. In the example shown in FIG. 17B, the on-diagonal element of the next level is Class B. Following this element in the implementation sequence are the off-diagonal elements of that level, proceeding from the right most off-diagonal element to the left most. This process is repeated for all subsequent levels of the design matrix. For the example shown in FIG. 17B, Sub-matrix D* follows Class B in the sequence. Then, proceeding to the third level, the on-diagonal element, Class C, is next in the sequence, followed by the two off-diagonal sub-matrices E* and F*. This same methodology may be used to determine a sequence of implementation within each class. For example, within Class A of FIG. 17B, the sequence of implementation would begin with element a, followed by element b, element c, element d, element e, element f, element g, and element h, in that order. If the design matrix is an upper-triangular matrix, the elements of the design are implemented in the opposite order. That is, the first element implemented is the bottom right on-diagonal element. Implementation proceeds up the design matrix by implementing the on-diagonal element on the preceding link followed by the off-diagonal elements of the preceding line. This process is performed until the sequence of implementation is identified. It should be understood that a sequence of implementation does not have to be determined at the class level. A sequence of implementation may be determined at any level of the design. For example, a sequence of implementation may be determined at a lower level, for the data members or methods of a class, or, in the case of non object-oriented software, for the data members and methods of the design. A sequence of implementation may also be determined at a higher level. For example, a sequence of implementation may be determined for a software component or software package. Thus, the invention is not limited to determining a sequence of implementation at the class level. A sequence of implementation may be determined at any level of the design at which coupling between elements can be analyzed.

In many cases, however, it may not be possible to achieve a completely decoupled design without significant changes in the design. Such changes may require a large amount of time and money to complete. For example, the design equation shown in FIG. 14A does not have a completely lower-triangular matrix, since element 1404 is above the diagonal. It is still possible to determine a sequence of implementation, although the sequence is not guaranteed to be non-iterative when sequencing the non-triangular elements. For example, in FIG. 14A, function requirement 3 has a dependency on function requirement 4, but function requirement 4 also has a dependency on function requirement 3. Thus, it is not clear which of these function requirements should implemented first.

Figures 14A, 14B:
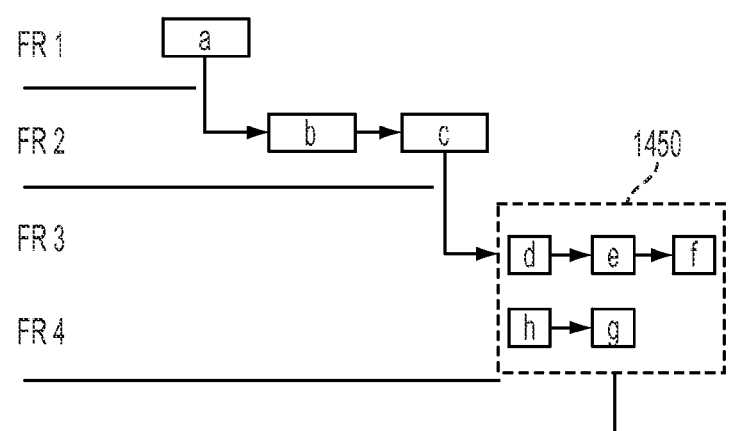
FIG. 14A is an example of a design equation illustrating a sequence of implementation of software components according to one embodiment of the invention.
FIG. 14B is block diagram of a sequence of implementation associated with the design equation of FIG. 14A.

FIG. 14B shows an example of a sequence of implementation for the design equation of FIG. 14A. The sequence of implementation is determined in the same manner as described above for function requirement 1 and function requirement 2. However, since a non-iterative implementation sequence for function requirement 3 and function requirement 4 cannot be given, these two functional requirements may be treated in the development sequence as a black box and thus may be represented in the development sequence as a single entity. As shown by box 1450, after the sequence of function requirements 1 and 2 are determined, function requirements 3 and 4 are sequenced together. Then, the sequence of the remainder of the function requirements (not shown) may be determined. Thus, even if a completely decoupled design cannot be determined, various aspects of the invention may be used to determine a more efficient programming sequence.

It should be understood that using a design matrix is only one way to represent and determine coupling between elements of a software design. The sequence of implementation may be determined by using other methods of identifying coupling and dependencies between software elements. Any method that provides information regarding coupling and dependencies between elements of a software design may be used and is intended to be within the spirit and scope of the invention.

In determining the sequence of implementation, certain components may be indicated as being implemented. A user may indicate, in a visual representation of the components, which components have been completed and which components have not. The visual representation may be, for example, a design equation, a flow chart, or a Gantt chart. In this instance, the system can either generate a sequence of implementation for only the components that have not yet been implemented or the system may generate a sequence of implementation for all components, indicating which ones have already been implemented. The components that have already been implemented may be indicated visually to a user of the system by a change in color or other markings in a visual representation of the sequence, or by removing the component from the visual representation of the sequence. It should be appreciated that other indication methods may be used.

Once the sequence of implementation is determined, a graphical representation sequencing information can be displayed within the system to a user. The graphical representation may be in the form of a Gantt chart or a flow chart, however any type of graphical representation that displays information related to the development sequence of elements may be used. Additionally, the information can be provided to another system or process, or the like. Also, implementation sequencing information may be exported to an external file which stores the sequence of implementation along with the expected time necessary to complete each step in the sequence. Additional information related to the project may also be included. For example, data may be transferred to UML via XML. Data may also be exported to a project planning file, such as, for example, the Microsoft Project exchange format (.MPX) or the Microsoft Project file format (.MPP). In the same way, projected planning applications, such as Microsoft Project may be adapted to import or create the sequencing data from an external file. It should be appreciated that the invention is not limited to any particular file format, and any file format which is capable of storing project planning information can be used. The developer may import this project planning information into a project managing application, such as Microsoft Project, in order to generate a visual representation of the sequence information, for example a Gantt Chart. Many other types of visual representations may be displayed, such as flow chart illustrating dependencies between elements. Various visual representations of the sequence of implementation will be discussed below in more detail.

Implementing the elements of the software design according to a non-iterative implementation path provides a developer with one method for reducing the development time and cost. However, according to another aspect of the invention, a developer may further reduce time and cost by reducing time involved in testing. Some prior art methods for testing a software application involve implementing each element separately, testing each element separately, then putting all the elements together and testing the application as a whole. This method is undesirable because a change to one element as a result of testing may necessitate changes in a number of other elements. Because previously tested elements are changed, they must be retested. Also, support programming is frequently required to simulate components that have not yet been programmed. That is, test stubs or harnesses must be implemented to simulate functions of components on which the component being tested depends. The coding of these test stubs and harnesses adds to the development time of the project and requires additional testing effort, thus increasing the cost of software.

Another prior art testing method known as "build and fix" involves implementing each element, integrating the elements, and then testing the application as a whole. This method is also undesirable because errors are introduced as a result of not testing each of the elements separately. More particularly, there are likely to be many errors within each element as well as errors caused by the interaction between elements. The "build and fix" method is described more completely in *Classical and Object-Oriented Software Engineering* Fourth Edition, by Stephen R. Schach, published by WCB/McGraw Hill, Boston, Mass., 1999, which is hereby incorporated by reference in its entirety.

Much like the sequence of implementation, it is desirable to have a non-iterative sequence of testing software elements. According to one aspect of the invention, a method is provided to identify a sequence of testing in which each element is tested only after all of the elements on which it as a dependency are tested. This sequence of testing can be determined by examining coupling between elements and determining their dependencies.

As discussed above, there may be a large number of elements in a software design that need to be tested. Because a testing schedule is complex it is desirable to have a method to track the sequence of testing elements. Because the design matrix relates dependency information between elements and may be used to develop a non-iterative path of programming, a design matrix may be used to determine the sequence of testing elements. For example, referring again to the design matrix shown FIG. 17A, suppose D* is tested before Class A. After extensive testing, sub-matrix D* is found to be free of any errors. Next, Class A is tested and the testing reveals an error DP 1.1.1. Thus, Class A must be modified to resolve this error. Because sub-matrix D* relies on DP 1.1.1, the error most likely has propagated into Class B* and this class will have to be tested again in order to ensure that the modification to Class A has not caused any problems in sub-matrix D*.

However, a sequence of testing software elements parallel to the sequence of implementation may be defined based on a decoupled design matrix in order to reduce any iterative testing. In addition, testing a component upon completion of implementation ensures that errors will not propagate down into coupled elements and also allows for a high overlap of development time and testing time. For example, referring to FIG. 4, Class A is first implemented then tested. Next, Class B and sub-matrix D* are implemented and tested. Although sub-matrix D* indicates a dependency between Class B and Class A, it may be tested under the assumption that Class A is error free, since Class A has already been implemented and tested. Finally, when the last sub-matrix, K*, is implemented, the software product may be tested as a whole under the assumption that all previously implemented elements will require no further changes. Also, it is not necessary to implement test stubs or harnesses to simulate elements that have not yet been built because elements on which the tested element depends are already implemented. In the case of an upper-triangular matrix, testing proceeds in the opposite order, starting with the bottom right on-diagonal element and proceeding up the design matrix. This method provides a more efficient method of testing than implementing all of the elements before testing any of them, since the number of modifications to previously tested elements will be reduced.

Similar to the sequence of implementation, in many cases it may not be possible to achieve a completely decoupled design without significant changes in the design. Such changes may require a large amount of time and money to complete. For example, the design equation shown in FIG. 14A does not have a completely lower-triangular matrix, since element 1404 is above the diagonal. It is still possible to determine a sequence of testing, although the sequence is not guaranteed to be non-iterative when sequencing the non-triangular elements. The sequence of testing for a non-triangular matrix may be determined in a similar manner as the sequence of implementation for non-triangular matrices, as described above. Even though a completely decoupled design cannot be determined, various aspects of the invention may be implemented to reduce the amount of testing.

It should be understood that using a design matrix is only one way to represent and determine coupling between elements of a software design. The sequence of testing may be determined by using other methods of identifying coupling and dependencies between software elements. Any method that provides information regarding coupling and dependencies between elements of a software design may be used and is intended to be within the spirit and scope of the invention.

In determining the sequence of testing, certain components may be indicated as already tested. A user may indicate, in a visual representation of the components, which components have been tested and which have not. The visual representation may be, for example, a design equation, a flow chart, or a Gantt chart. In this instance, the system can either generate a sequence of testing for only the components that have not yet been tested or the system may generate a sequence of testing for all components, indicating which ones have already been tested. The components that have already been tested may be indicated visually to a user of the system by a change in color or other markings in a visual representation of the sequence, or by removing the component from the visual representation of the sequence. It should be appreciated that other indication methods may be used.

In addition, when incorporating legacy code or previously implemented code, such as a Java Bean into a design, it may be necessary to retest these previously implemented components. For example, suppose a design consists of four components, A, B, C and D. An implementation sequence can be produced for these components, as described above. Suppose components A and C are previously implemented and components B and D are not yet implemented. Thus, the sequence of implementation might only include components B and D. However, suppose that there is a coupling between B and C. That is, a change to B might require a change in C. Thus, the sequence of implementation would be B, C, D. However, component C is not intended to be re-implemented. It is only intended to be re-tested once component B is completed. Thus, one can indicate in the sequence of implementation which components need to be implemented and which components need only to be re-tested and possibly modified as a result of the testing.

Similar to the sequence of implementation, a graphical representation of the sequence of testing may be displayed within the system to a user. The graphical representation may be in the form of a Gantt chart or a flow chart, however any type of graphical representation that displays information related to the coupling of elements may be used. Additionally, the information can be provided to another system or process, or the like. Also, the testing sequence information may be exported into an external file which stores the sequence of testing along with the expected time necessary to complete each step in the sequence. Additional information related to the project may also be included. For example, data may be exported to a UML file. Data may also be exported to a project planning file, such as, for example, the Microsoft Project exchange format (.MPX) or the Microsoft Project file format (.MPP). In the same way, project planning applications such as Microsoft Project may be adapted to import or create the sequencing information from an external file. It should be appreciated that the invention is not limited to any particular file format and any file format which is capable of storing project planning information can be used. The developer may import this project planning information into a project managing application, such as Microsoft Project, in order to generate a visual representation of the sequence information, for example a Gantt Chart. Many other types of visual representations may be displayed, such as flow chart illustrating dependencies between elements. Various visual representations of the sequence of testing will be discussed below in more detail.

As mentioned above, visual representations of the sequence of implementation and the sequence of testing may be automatically generated and displayed to the developer. In one embodiment, components can be represented in a flow chart as boxes which illustrate which functional requirements and design parameters constitute each component. A component can be one or more object-oriented classes defined in the design matrix or any logical grouping of elements of a design. A component may be, for example, an object-oriented class, multiple object-oriented classes, a data member, a method, or a software package. The sequence of components can illustrated by placing the box corresponding to each component along a horizontal axis according to the order in which the component will be coded. This order may be determined by descending down the vertical axis of the design matrix and looking for dependencies between components that are lower on the vertical axis and components that are higher. Once the sequence is determined the dependencies can be indicated by drawing an arrow between the box for each component and all the components that depend on that component. These dependencies are shown as off diagonal markers in the design matrix.

Figure 12:
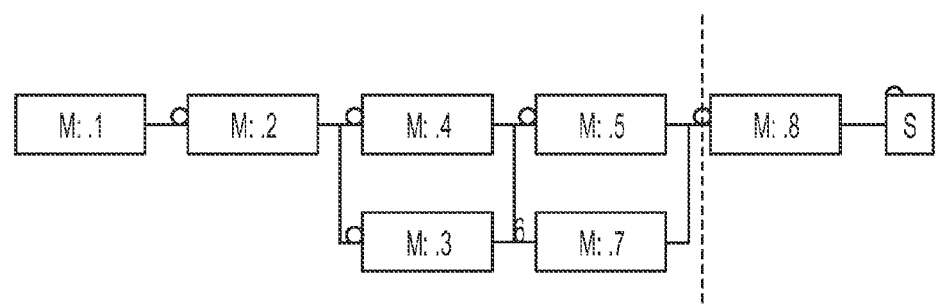
FIG. 12 shows an example flow chart illustrating a sequencing of components associated with the design equation of FIG. 11 according to one embodiment of the invention.
Figure 13:
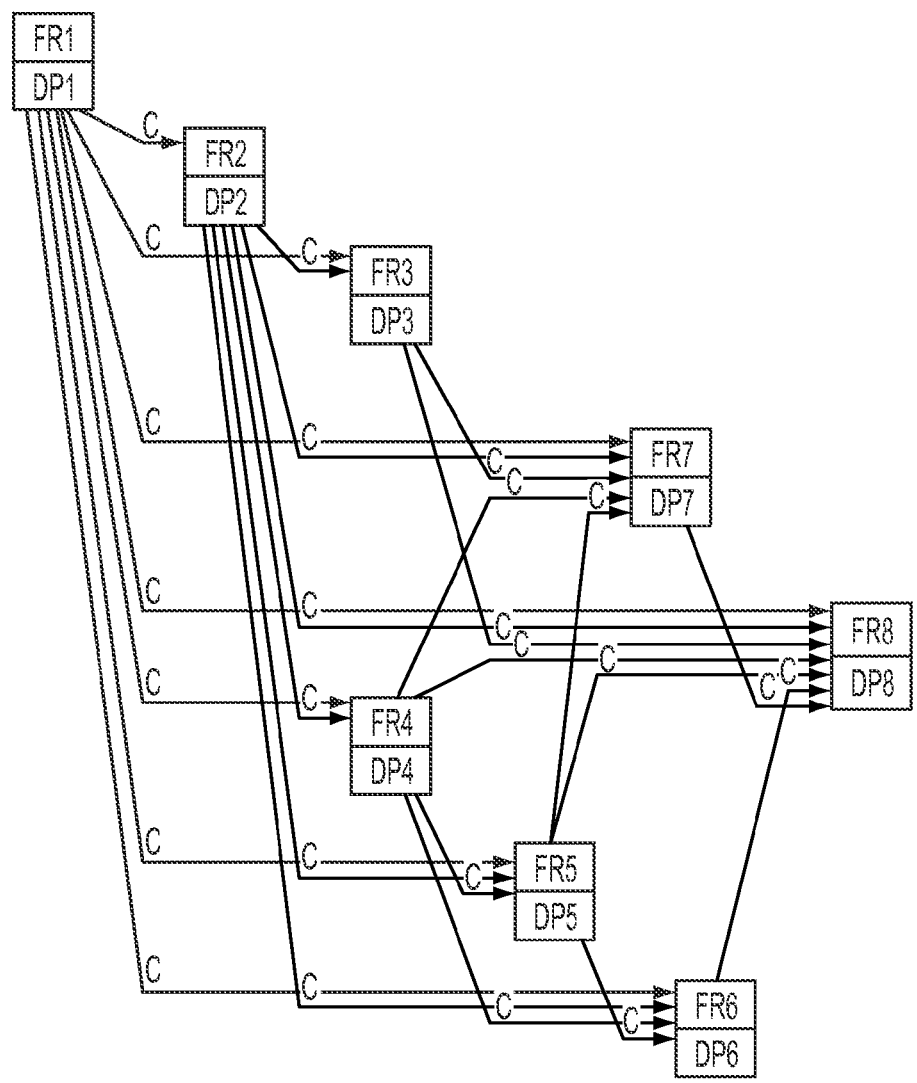
FIG. 13 shows an example flow chart illustrating sequencing and dependencies of components associated with the design equation of FIG. 11 according to one embodiment of the invention.

FIG. 12 shows an example of a flow chart described in the book entitled "Axiomatic Design Advances and Applications." The flow chart of FIG. 12 shows a sequence of implementation but does not illustrate the coupling between all the elements of the design equation. For example, referring to FIGS. 11 and 13 in which an example of a design equation and a flow chart associated with the design equation are shown, in order to determine which components have a dependency Component A, one would determine which design parameters are included in Component A and then descend down the vertical axis of the design matrix to find which other components use or rely on these design parameters. Thus, a line is drawn for each off-diagonal element in the design matrix. This process may be performed for each component. However, this information is not reflected in the prior art flow chart of FIG. 12.

Thus, such a flow chart displays a system architecture, revealing the design sequences between the components which is defined in terms of the (FR/DP) or (DP/PV) relationship. Also, such a flow chart is useful for managing changes in the implementation of the design. When making a change to a component it is easy to see which other components depend on the component to be changed. Therefore, it is easy to identify the other objects which could be affected by a change to another component. Also, when adding or removing components from a design, the flow chart clearly illustrates which components could be impacted by the addition or removal of a component. Thus, a designer can position a component to be added in the sequence of components so that the fewest number of other components are affected by the addition. Similarly, the designer can remove or change components so that the fewest number of other components will be affected by the removal or change. In addition, a programmer can avoid recursively testing software by following the order of implementation or order of testing of components displayed in the flow chart. The flow chart provides a graphical representation of the sequence of implementation or the sequence of testing so that the programmer can easily visualize the dependencies between elements in a design. This is also useful when many developers in different geographical locations are collectively implementing a design. The flow chart allows the developers to identify the order in which components can be implemented. Because components are implemented and/or tested in the proper order, programmers avoid development inefficiencies. For example, a developer does not need to wait for other developers to complete implementation of other components if the developer can identify a component to be developed that does not depend upon incompleted components. The flow chart may also be used to monitor a development status of a software project.

In another embodiment of the invention, the element of time may be incorporated into the visualization of the sequencing of components, for example in a Gantt Chart. FIGS. 9A and 9B show a design equation 950 and a flow chart 901 generated for classes defined in the design equation 950. More particularly, flow chart 901 shows a sequence in which software should be produced. Similarly, a Gantt chart may be generated which shows the estimated development periods for each of the individual elements of the design matrix. As shown in FIG. 9B, element A (item 902) is followed in sequence by element B of the design matrix (903). These elements, may be for example, classes that are identified within the design matrix, and may include one or more elements. Further, development of element B is followed by a parallel development of elements C (item 904) and element D (item 905), which is in turn followed by a development of element E (item 906).

FIG. 9C shows a Gantt chart also generated from information stored within the design matrix and which corresponds to flow chart 901. More particularly, Gantt chart 910 shows a number of time periods along a time line which indicates the sequence and time necessary (or planned) to develop one or more software components associated with elements in the design matrix. As is shown in FIG. 9B, there is a development time 911 associated with element A followed by a time of development 912 of elements B followed by parallel periods of development for item for elements C and D (items 913 and 914, respectively). Following the greater of the parallel developments of C and D, a period of development 915 of element E begins.

However, according to one embodiment of the invention it is realized that there is significant development time associated with elements of the design matrix that link components located on a diagonal of the design matrix. For example, FIG. 10A shows coupling between elements A and D (element 1052). This information is also illustrated in the flow chart of FIG. 10B (item 1002). Thus, in this example, a dependency exists between components A and D. As is shown in FIG. 10C, a Gantt chart 1003 may be used to indicate additional development time associated with the off-diagonal element linking components A and D. This additional development time, labeled AD (item 1004) is added to chart 1003 as a time period following the development time of the last coupled element in the sequence. For example, component D is developed later in the sequence then component A as is shown in chart 1001, and any dependent element that links components A and D should be developed after component A and D are defined. That is, in developing elements of the design matrix, off-diagonal elements are developed following the development of the components which they link. Therefore, as is shown in FIG. 10B, period AD 1004 is added following the period 914 for developing element D. However, because the element linking components A and D may have an effect on later-developed components, such as element E, this period 1004 is located before the period 915 for developing element E.

FIG. 11 shows an example design equation 1101 which may be used to determine flow chart 1001 and Gantt chart 1003 as shown in FIG. 11, components A-E (items 1103-1107) are located along a diagonal 1108 of design equation 1101. As discussed previously, design equation 1101 relates functional requirements 1102 to design parameters 1110. Also located within design matrix 1101 is an off-diagonal element which links component A (1103) to component D (1106). This off-diagonal element 1109 indicates that there is a dependency between components A (1103) and component D (1106). For example, component D may call a function or use one or more attributes of component A (1103). Other dependencies between components are possible.

Additionally, a Gantt chart may be weighted in order to describe the manpower required to complete each task. For example, it may be determined that three people are required to complete a first task, but only two people are required to complete a second and third task. This weighting information may also be displayed in the Gantt chart to assist in planning.

Such a display of a Gantt chart is very useful for a software developer, as a significant amount of time is spent linking components. Practically, programmers use and integrate existing components (such as components provided as part of a software library) to create larger systems, and these off-diagonal elements represent linkings between these components. In the case where software components make up a majority of the design, development time for these off-diagonal elements also predominate the design schedule. By representing off-diagonal elements in a Gantt chart, software developers can be provided a more realistic estimate of development schedule and sequencing.

Coding Process Improvements, Documentation, and Performance Improvements

The design hierarchy may have a different shape depending on a higher-level design decision, meaning that if a designer selects different Design Parmeters (DPs) for one level to make an uncoupled or decoupled design, the child level information may vary depending on the DP selection. This design feature improves reusability because lower-level details of a program do not require modification if changes are made at a higher level of the design hierarchy. For example, after a company designs their software using axiomatic design principles, they may want to choose previously-designed DPs for their new software project. Decomposition for the previously-designed DPs are not required; only a small amount of modification of the source code which represents the previously-designed DPs and their associated lower level hierarchies to fit the new project may be needed. Therefore, the result of each individual software development project can be stored in a storage structure such as a design database or a custom data structure and referred to by a programmer at any time.

As shown in FIG. 15, all decision making of the design process can be documented and saved automatically. Thus, all design decisions and alternatives to the design decision and their associated design matrices can be stored. This allows developers or new designers who were not involved in the original design process to understand why certain design decisions were made. For example, referring to FIG. 15, suppose a designer who is developing software has to make a decision on how to satisfy functional requirement 1 (FR1). One choice he could make is Decision A, which would use Design parameter 1, shown in section B of the drawing, to satisfy FR1. This design decision results in three new functional requirements, 1.1, 1.2, and 1.3. The designer then satisfies these three functional requirements with design parameters 1.1, 1.2, and 1.3. He then puts these functional requirements and design parameters into a design matrix shown in section C of the drawing. By inspecting the matrix, the designer realizes that he has a coupled design. The designer realizes that Decision A is not a desirable option, so he repeats the process this time using Decision B, satisfying FR1 with design parameter 1A. This results in two new functional requirements 1.1A and 1.1B. The designer satisfies these requirements with design parameters 1.1A and 1.1B. The resulting design equation shows that this design is decoupled, and thus a better option than Decision A. Both of these design matrices can be saved in order to document why such a decision was made. This documentation is beneficial for designers who join a project later in development and need to understand the history of development, and why particular design decisions were made.

This ability to record design decisions additionally helps to bridge the communication gap between those who design software and the programmers who implement it. Since the programmers can use design documents generated from the design equation, any changes to the design that the designers make will be reflected in the design documents. Also the reasons for these decisions can be documented along with the rest of the design since alternative design decisions and alternative design matrices can be saved.

This design process further allows the designer to easily test his design decisions and experiment with a variety of different design decisions. Since a designer can easily visualize the amount of coupling in his design by putting the functional requirements and design parameters into the design equation, he can avoid the tedious process of having to implement the entire design to test for a highly coupled design. Furthermore, the designer can test a variety of different designs in the design matrix to determine which has the least amount of coupling. Additionally, it is easy to monitor the progress of a software project by simply keeping track of the percentage of elements in the design matrix that have been implemented.

In the design process, reusable code or shared libraries from previous projects or applications are often incorporated into a design to reduce the amount of coding that must be done. Often, software components such as Enterprise Java Beans (EJB) are used as reusable components. In a similar way as described above, a designer can test how well this reusable code fits into his design. He can also determine how to fit this code into his design to minimize coupling. Also, a designer can "test" the quality of software components by determining the amount of coupling within the representation of the source of code within the design matrix.

Alternatively, the designer can use the design matrix to identify components in his own design that could be reused later. For example, a designer could identify, in a design matrix such as the one shown in FIG. 15, that Class A, Class B, and Class C, together constitute a component that is reusable. However, sometimes the functionality of all of these classes is not required. Thus, if only the functionality of Class A is required, the code for Class B and Class C need not be included in the reusable component, since Class A has no dependencies on Class B or Class C. If only the functionality of Class B is required, Class A must be included in the component, but Class C need not be included. Thus, the amount of code included in a reusable component may be reduced by evaluating the coupling between components.

Having now described a few embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

For example, it can be appreciated by one skilled in the art that various embodiments of the invention could be incorporated in a standalone system, distributed system, or could be incorporated into an existing design tool system. For example, various aspects of the invention may be incorporated in a software design tool such as Rational Rose, available from the Rational Software Corporation. For example, information may be extracted from the data files used by such a software design tool. The data extracted from the files can be used to generate a design equation or sequencing and scheduling information. The data files may be in any format, including XMI and UML.

What is claimed is:

1. In a computer comprising at least one hardware processor and at least one tangible memory, a method for reverse engineering software code stored in the at least one memory, the method comprising:
a) determining a structure of at least two object-oriented software components represented by the software code, wherein the at least two object-oriented software components include a first object-oriented software component and a second object-oriented software component, and wherein the method further comprises determining the structure of the first object-oriented software component by determining a first class name of a first object-oriented class from which the first object-oriented software component is instantiated, determining a first set of attributes of the first object-oriented class, and determining a first set of methods of the first object-oriented class, and determining the structure of the second object-oriented software component by determining a second class name of a second object-oriented class from which the second-object oriented software component is instantiated, determining a second set of attributes of the second object-oriented class, and determining a second set of methods of the second object-oriented class;
b) determining dependencies between the first and second object-oriented software components by determining whether any method in the first set of methods invokes any method in the second set of methods, determining whether any method in the second set of methods invokes any method in the first set of methods, determining whether the first object-oriented class is a subclass of the second-object oriented class, and determining whether the first object-oriented class is a superclass of the second object-oriented class;
c) creating a design matrix that indicates the dependencies between the first and second object-oriented software components;
d) determining mappings between functional requirements and design parameters in the design matrix at least one level above the terminal level, grouping the mappings into sub-matrices of the design matrix, wherein any sub-matrix mapping functional requirements and design parameters from the same level and one level above the terminal level is identified as a candidate for an object oriented class; and
e) determining an implementation sequence of object oriented classes identified from the design matrix, wherein the implementation sequence is selected to reduce the amount of iterative development by tracking coupling between software elements using the design matrix and modifying the design matrix to reduce coupling between the software elements.

2. The method according to claim 1, wherein the act of creating the design matrix includes an act of determining placement of components within the design matrix.

3. The method according to claim 1, wherein the act of creating the design matrix further comprises creating, in the design matrix, a hierarchy of elements, the hierarchy of elements depending upon the relationship between the at least two components.

4. The method according to claim 3, wherein the act of creating the design matrix further comprises creating elements in the design matrix corresponding to methods identified within the software code.

5. The method according to claim 4, wherein the act of creating the design matrix further comprises determining on-diagonal elements of the design matrix.

6. The method according to claim 4, wherein the act of creating the design matrix further comprises determining off-diagonal elements of the design matrix.

7. The method according to claim 1, wherein the act of creating the design matrix comprises reducing circular dependencies between elements of the design matrix.

8. The method according to claim 1, wherein the act of creating the design matrix comprises determining at least one arbitrary functional requirement, wherein the arbitrary functional requirement includes a functional description which is not defined in the act of determining the structure of at least two object-oriented software components.

9. The method according to claim 8, wherein the arbitrary functional requirement is determined by a user after one or more elements of the design matrix are determined.

10. The method according to claim 1, wherein the software code is written in the C++ language.

11. The method according to claim 1, wherein the software code is written in the Java programming language.

12. The method according to claim 1, wherein the software code is a description of a code structure.

13. The method according to claim 12, wherein the description of the code structure is in a markup text formatting language format.

14. The method according to claim 13, wherein the description is provided in HTML format.

15. The method according to claim 1, wherein the software code is a first source of code, and wherein the method further comprises combining a representation of a second source of code with the representation of the first source of code in the design matrix.

16. The method according to claim 15, wherein the first source of code is part of a code library.

17. The method according to claim 1, further comprising evaluating functionality of the first source of code by inspecting the design matrix.

18. The method according to claim 1, further comprising representing, to a user, a visual representation of the design matrix.

19. The method according to claim 18, further comprising indicating, to a user, decoupled elements of the design matrix that indicate that a software component is suitable for reuse.

20. The method according to claim 19, further comprising indicating that at least one element of the design matrix is decoupled.

21. The method according to claim 1, further comprising providing, to a user, an indication to a user, a degree of coupling between the at least two object-oriented software components.

22. The method according to claim 15, further comprising facilitating development of one or more off-diagonal elements of the design matrix, the one or more off-diagonal elements linking the representation of the second source of code with the representation of the first source of code.

23. The method according to claim 1, further comprising determining an amount of coupling between the at least two object-oriented software objects, and evaluating a performance of the at least two objects, the performance being based at least in part on the amount of coupling between the at least two object-oriented software components.

24. The method according to claim 23, wherein the amount of coupling depends upon one or more off-diagonal elements in the design matrix.

25. The method according to claim 1, further comprising representing, to a user, a visual representation of the design matrix, and indicating, within the design matrix, elements of the representation of the software code as being related to the software code.

26. The method according to claim 25, further comprising determining an amount of coupling between the at least two object-oriented software components, and evaluating a performance of the at least two object-oriented software components, the performance being based at least in part on the amount of coupling between the at least two object-oriented software components.

27. The method according to claim 25, further comprising indicating, to a user, decoupled elements of the design matrix that indicate that at least one of the at least two object-oriented software components is suitable for reuse.

28. The method according to claim 25, further comprising indicating that at least one element of the design matrix is uncoupled.

29. The method according to claim 25, further comprising providing, to a user, an indication to a user, a degree of coupling between the at least two object-oriented software objects.

30. The method according to claim 25, further comprising facilitating development of one or more off-diagonal elements of the design matrix, the one or more off-diagonal elements linking the representation of a first of the at least two object-oriented software components with a second of the at least two object-oriented software components.

31. The method according to claim 1, wherein the first source of code is a compiled Java byte code.

32. At least one memory device storing at least one program that, when executed by at least one processor, performs a method for reverse engineering software code stored in the at least one memory, the method comprising:
   a) determining a structure of at least two object-oriented software components represented by the software code, wherein the at least two object-oriented software components include a first object-oriented software component and a second object-oriented software component, and wherein the method further comprises determining the structure of the first object-oriented software component by determining a first class name of a first object-oriented class from which the first object-oriented software component is instantiated, determining a first set of attributes of the first object-oriented class, and determining a first set of methods of the first object-oriented class, and determining the structure of the second object-oriented software component by determining a second class name of a second object-oriented class from which the second-object oriented software component is instantiated, determining a second set of attributes of the second object-oriented class, and determining a second set of methods of the second object-oriented class;
   b) determining dependencies between the first and second object-oriented software components by determining whether any method in the first set of methods invokes any method in the second set of methods, determining whether any method in the second set of methods invokes any method in the first set of methods, determining whether the first object-oriented class is a subclass of the second-object oriented class, and determining whether the first object-oriented class is a superclass of the second object-oriented class;
   c) creating a design matrix that indicates the dependencies between the first and second object-oriented software components;
   d) determining mappings between functional requirements and design parameters in the design matrix at least one level above the terminal level, grouping the mappings into sub-matrices of the design matrix, wherein any sub-matrix mapping functional requirements and design parameters from the same level and one level above the terminal level is identified as a candidate for an object oriented class; and
   e) determining an implementation sequence of object oriented classes identified from the design matrix, wherein the implementation sequence is selected to reduce the amount of iterative development by tracking coupling between software elements using the design matrix and modifying the design matrix to reduce coupling between the software elements.

* * * * *